United States Patent [19]

Wilcock et al.

[11] 3,708,215

[45] Jan. 2, 1973

[54] HYBRID BOOST BEARING ASSEMBLY

[75] Inventors: Donald F. Wilcock; Leo W. Winn, both of Schenectady, N.Y.

[73] Assignee: Mechanical Technology Incorporated, Latham, N.Y.

[22] Filed: Nov. 14, 1968

[21] Appl. No.: 775,672

[52] U.S. Cl. ................................. 308/35, 308/9
[51] Int. Cl. ............................................ F16c 32/00
[58] Field of Search .............................. 308/35, 9

[56] References Cited

UNITED STATES PATENTS

| | | | |
|---|---|---|---|
| 1,441,614 | 1/1923 | Wadsworth | 308/160 |
| 2,623,353 | 12/1952 | Gerard | 308/35 X |
| 3,026,154 | 3/1962 | Marchand | 308/35 |
| 1,175,415 | 3/1916 | Egbert | 308/35 |
| 2,875,001 | 2/1959 | Miller et al. | 308/35 |
| 3,065,036 | 11/1962 | Trotter | 308/35 |

FOREIGN PATENTS OR APPLICATIONS

| | | | |
|---|---|---|---|
| 1,002,342 | 10/1951 | France | 308/35 |
| 311,338 | 1/1956 | Switzerland | 308/35 |
| 464,649 | 8/1928 | Germany | 308/35 |
| 937,515 | 9/1963 | Great Britain | 308/35 |
| 937,684 | 9/1963 | Great Britain | 308/35 |

*Primary Examiner*—Benjamin W. Wyche
*Assistant Examiner*—Barry Grossman
*Attorney*—Charles W. Helzer

[57] ABSTRACT

A hybrid boost bearing assembly is described for a rotating shaft member which is rotatably supported on a base member. The hybrid boost bearing assembly comprises a rolling element bearing for rotatably supporting the shaft member on the base member during starts, stops, reverse thrust loadings and under emergency operating conditions, and a fluid film bearing acting singly or coacting with the rolling element bearing for absorbing the loads imposed on the shaft member during all other conditions of operation. A fluid lubricant supply is provided for supplying fluid lubricant to the bearings and means are provided for shifting the loading of the rotating shaft member from the rolling element bearing to the fluid film bearing as the rotating shaft member is brought up to its normal operating speed. The means for shifting the loading from the rolling element bearing to the fluid film bearing comprises the generation of pressure in the fluid film space between the opposed fluid film bearing surfaces, by hydrodynamic action, from an external source of pressure, or by some other means, thereby causing the fluid film bearing to assume a greater share of the load of the rotating shaft as it is brought up to normal operating speed. As a result, the rolling element bearing will assume substantially the full load of the rotating shaft only during starting, stopping, reverse loading periods, and in the event of the failure of the fluid lubricant supply, while the fluid film bearing will absorb the shaft loads under all other conditions of operation. The fluid film bearing may comprise a hydrodynamic bearing for producing a self-acting fluid film, a hydrostatic bearing, or a hybrid hydrodynamic-hydrostatic bearing, and the rolling element bearing may comprise a ball bearing, roller bearing, needle bearing, or the like. In certain arrangements a preloading spring is provided for preloading the rolling element bearing a predetermined amount so that the rolling element bearing assumes a predetermined proportionate share of the loading on the rotating shaft under certain operating conditions. In other arrangements, a retractable bearing piston portion which moves towards and retracts from an opposed, load-sustaining bearing surface is employed to cause the fluid film bearing to assume the load from the rolling element bearing. In other arrangements, a spherically-shaped self-aligning seat is provided which coacts with a complementary-shaped seating surface to accommodate misalignment in the rotating shaft supported by the bearing assembly.

13 Claims, 17 Drawing Figures

INVENTORS
DONALD F WILCOCK
LEO W. WINN

INVENTORS
DONALD F WILCOCK
LEO W. WINN

BY Charles W. Helzer
ATTORNEY

PATENTED JAN 2 1973 3,708,215

INVENTORS
DONALD F. WILCOCK
LEO W. WINN

*Charles W. Helzer*

ATTORNEY

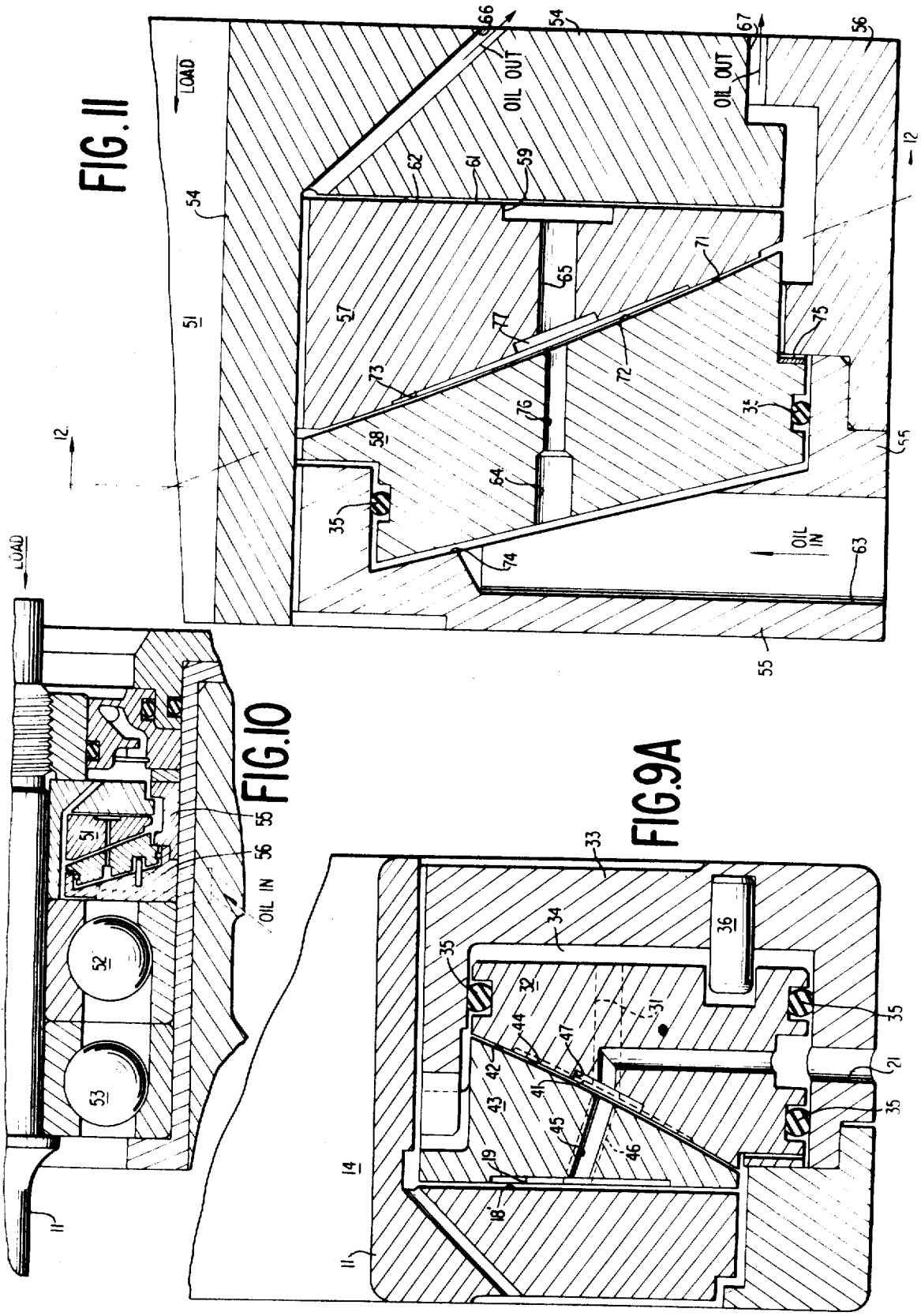

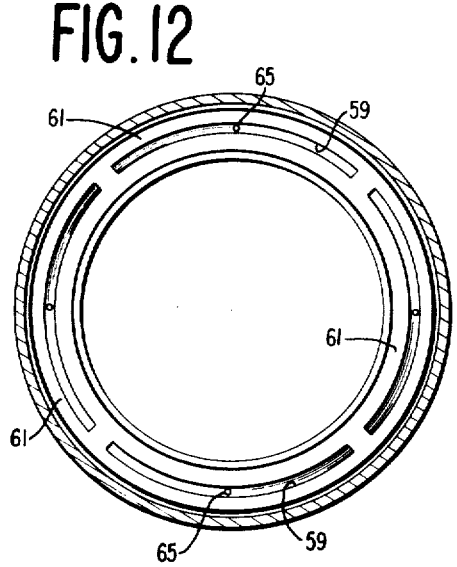
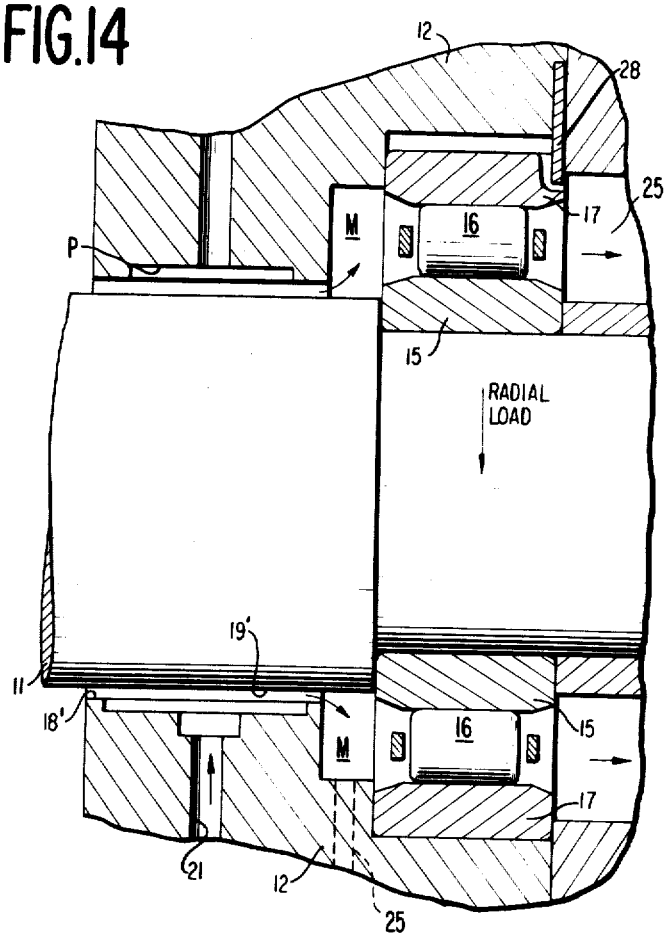
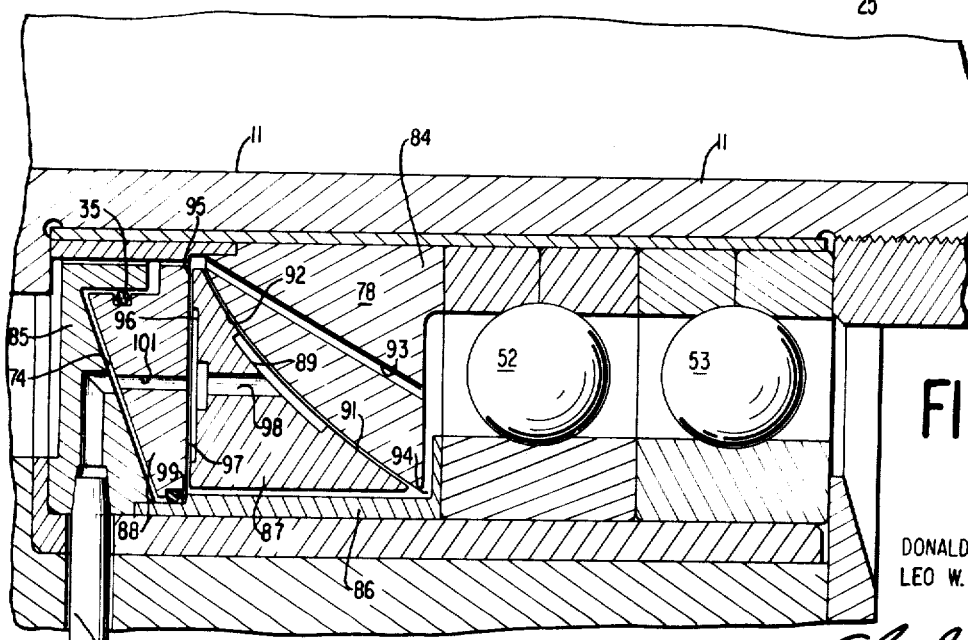

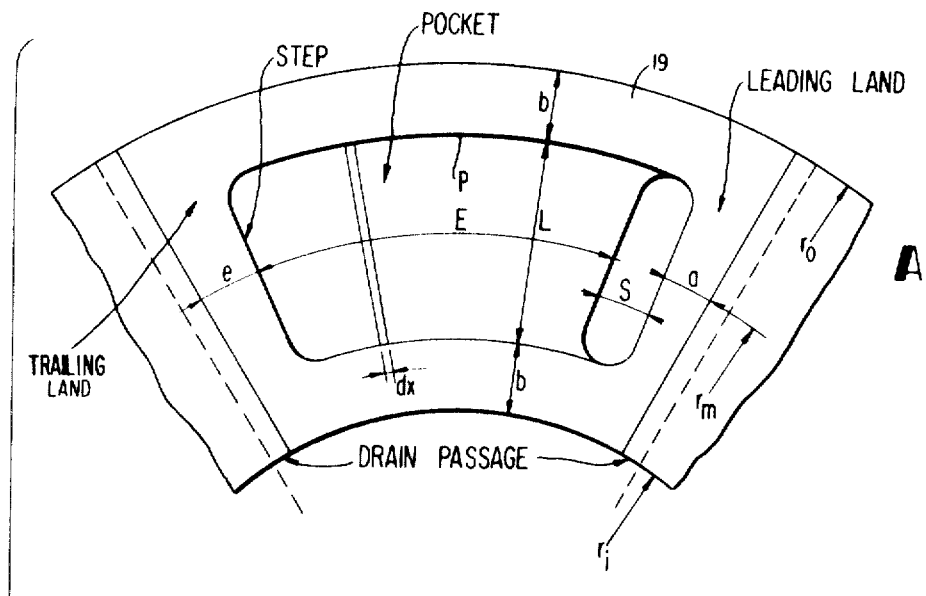
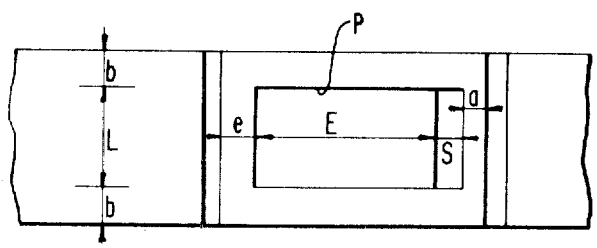
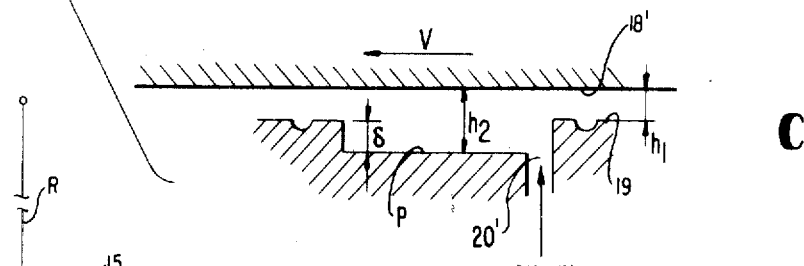
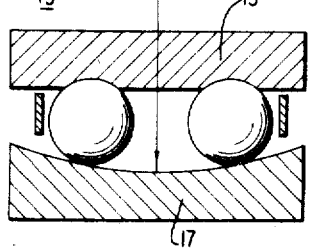
FIG.15
FIG.16

HYBRID BOOST BEARING ASSEMBLY

BACKGROUND OF THE INVENTION

1. Field of Invention The invention described herein relates to bearings and more particularly to a new and improved hybrid boost bearing that combines the desirable design features and performance characteristics of a rolling element bearing and a fluid film bearing in a single assembly. It applies to thrust bearings, radial bearings or combined-load bearings.

More particularly, the invention relates to a hybrid boost bearing assembly of the above type wherein the load imposed on the overall bearing assembly is carried by the fluid film bearing during most of the operating time, while the rolling element bearing functions to carry the load only during starting, stopping and any reverse load periods in order to avoid contact between the parts of the fluid film bearing, and during emergency conditions, such as that resulting from failure of lubrication. As a result, the rolling element bearing is subjected to and carries the full load only during transient starting, stopping or reverse thrust periods, or during emergency lube system failure periods, the totality of which do not seriously affect the fatigue life of the assembly.

2. Description of Prior Art

One of the major limiting factors on the life of both low and high-speed rotating machinery, such as steam or gas turbines, pumps, or the like, is the fatigue endurance life of the rolling element bearing assembly conventionally used in carrying the applied loads. Recently the problem has become more acute since the thrust loads on bearings used in current designs of machinery have reached such magnitudes that the fatigue life of the balls and races is much shorter than desired. This fatigue life limit is of a statistical nature so that the life is uncertain and in addition it varies quite widely with particular machinery designs and the nature of their use. There are, likewise, factors which limit the use of fluid-film bearings despite their simplicity and long running life. These factors are the rubbing contact at low speeds which results in high starting torque and wear and surface stress under repeated starts and stops, and the inability in high speed service to operate safely if the lubricant system fails. These factors, for example, have resulted in their exclusion from aircraft jet engine designs, while they are used in land based gas turbines.

Consideration of the factors which directly contribute to early fatigue of rolling element bearings, such as centrifugal forces, inadequate quality and quantity of lubricants, wear and fracture of the metal components, and the like, shows that a great need exists for an improved bearing having long life, great reliability, and desirably, of inexpensive design.

Considering each of these factors separately, in high speed rotating equipment, the centrifugal load imposed by the balls on the outer race often becomes sufficiently large to effect serious reductions in the normally predicted fatigue life. It has been shown that as the speed increases, the expected bearing life decreases as the centrifugal ball load becomes significant and the forces tend to shift the maximum stress zone from the bearing inner race to the outer race. In the case of angular contact ball bearings, the effect of centrifugal force is more complex since the bearing contact angle also shifts under centrifugal force. For a given size rolling element bearing, centrifugal effects are more severe the larger the size of the rolling element. Therefore, if large diameter bearings need to be used for reasons of rotor rigidity and satisfactory rotor response behavior, very light weight rolling elements in the bearing must be used to minimize centrifugal effects in the higher speed machinery. Accordingly, a bearing design which minimizes loads on the rolling element bearing, or which permits the use of a lighter series bearing, can provide a significantly longer-lived assembly.

Additionally, some of the synthetic lubricants used in machinery operating at relatively high temperatures have a tendency to reduce bearing life. Observations show that the predicted bearing fatigue life is adversely affected by synthetic lubricants, apparently because of poorer film forming capability. Reductions by a factor of two or more have been reported over the expected fatigue life where certain bearing assemblies have employed synthetic lubricants in place of natural petroleum lubricants. Some of these synthetic lubricants have been observed to begin to show surface wear at Hertz stress levels of 195,000 psi, and it has been hypothesized that this evidence of wear at relatively low stress levels for rolling contact type action arises from poor elastohydrodynamic performance in the lubricant film. Thus, the pressure-viscosity-time properties of such fluids are such that the desired film thickness cannot be maintained when used under the demanding conditions existing in machinery, such as jet engines, operating at high temperature levels. Consequently, bearing loading may be limited more by the wear phenomenon than by fatigue. In such situations, the application of a bearing concept which relieves the rolling element bearing of the major part of its load can greatly increase the load-carrying capacity available in any given bearing size.

The limit that metal fatigue sets on the life of a rolling element bearing is a well-known phenomenon, and has been described in a number of prior art publications such as the book "Ball and Roller Bearing Engineering" by Palmgren, and in the textbook entitled 'Advanced Bearing Technology' by Bisson and Anderson. A review of this prior art literature shows that advances made in the cleanliness of the bearing steel, achieved through vacuum and consumable arc processing, have resulted in perhaps a three-fold increase in the assured life of ball bearing steel over that predicted on the basis of standard 52,100 steel. Furthermore, the introduction of the harder tool steels into bearing manufacture has provided a further increase in life, although this work was done primarily to obtain improved stability of dimension, hardness and higher operating temperatures. The important point to be appreciated is that there is a strong relationship between expected fatigue life of a rolling element bearing and bearing load, and that the bearing life decreases rapidly approximately in proportion to the cube of the bearing load. Thus, a modest increase in the load can result in a serious reduction in the expected life of a rolling element bearing. Conversely, if by any means the load on the bearing can be substantially reduced, it will result in a dramatic increase in its fatigue life.

For a number of sound technical reasons, present airborne machinery almost exclusively uses rolling element thrust bearings for carrying the main unbalanced thrust loads. In jet engines of the type used in aircrafts, helicopters, and the like, in order to carry the heavier loads involved, there is a greater trend toward the use of two or more such rolling element bearings working in a duplex mount. Although duplex mounting arrangements are satisfactory, considerable technical effort must be applied to the design to assure that the tolerances are correct for the loads and speeds expected to be encountered and that the bearings will properly share the thrust and radial loads imposed by the rotating components on the duplex arrangement. The expense and effort required in arriving at a correct bearing design, along with the normal risks incurred in utilizing duplex bearing mounts suggests the existence of a great need for a bearing assembly wherein all of the above factors will be minimized.

3. Important Bearing Criteria

In general, there are five criteria which are considered to be significant in judging the performance of any particular bearing design for use with jet engines, turbines, helicopter power trains, pumps, or other bearing applications. These criteria are the fatigue life of the bearing, the ability of the bearing to withstand starts and stops, low temperature starting characteristics of the bearing, the operating characteristics of the bearing in the event of a lubrication system failure, and high DN (bearing bore diameter x shaft speed) designs.

These criteria can be applied to four basic thrust bearing designs to illustrate the principles discussed hereafter and they should not be considered as being limited to thrust bearings alone. The four basic thrust bearing designs are the angular contact ball bearing, the hydrodynamic fluid film bearing, and hydrostatic fluid film bearing, and the hybrid (hydrostatic-hydrodynamic) bearing. Table 1 below sets forth in tabular form the important desirable and undesirable operating characteristics of each of these bearing designs.

TABLE 1

| | Bearing Type angular cont. ball bearing | hydro dynamic | Hydro static | Hybrid |
|---|---|---|---|---|
| limit on life | fatigue | none | none | none |
| starts & stops (with engine-driven pump) | good | poor | poor | poor |
| starting torque at low temp.(engine-driven pump) | low | high | high | high |
| operation after oil system failure | good | fair | poor | poor |
| high DN designs | Reduced Fatigue Life | Extra Cap. | Extra Cap. | Extra Cap. |

From a consideration of Table 1, it will be appreciated that the angular contact ball bearing has distinctly limited fatigue life. Some of its other characteristics are as follows: If the bearing housing of the angular contact ball bearing is properly designed with some means for retaining some oil in the bearing should the lubricant supply be cut off, for example, by inserting the drain lines above the lowest level in the races, then the angular contact ball bearing has good capability of starting successfully without a supply of pump-furnished oil or other lubricant, and of stopping with a diminishing supply of oil from the pump as the shaft slows down. Many years of experience with this type of bearing has confirmed the desirability of this design characteristic. Similarly, starting torque at low temperatures is generally low because most of the rolling and sliding contacts in the bearing have only a minimum amount of lubricating oil remaining on them, with most of the lubricating oil having been drained away to the sump. Because of the retention of some oil in the bearing cavity, by the design technique mentioned above, the ball bearing has a good capability for operating over an extended period of time after a lubricating oil system failure.

Where the thrust load is relatively constant, the hydrodynamic bearing type has essentially no limit on its fatigue life. If the bearing materials are chosen to be compatible with the lubricant used, so that there is an absence of corrosion and chemical attack, and if the bearing design is such that high-speed rubbing contact is avoided during operation, operating life of this type of bearing may be considered to be infinite. Some of the commonly known hydrodynamic bearing designs are the tapered land, the shrouded step, the tilting-pad and the spiral-groove bearing, and all of these designs possess the above characteristics. However, the performance of the hydrodynamic type of bearing with regard to starts and stops is very poor. Such a bearing often experiences a period of metal to metal rubbing during starts, and if there is any substantial load during stopping, a similar difficulty will be experienced. The starting torque of hydrodynamic bearings at low temperature is high since the oil retained in the fluid film will have to be sheared, and if oil is absent, metal to metal contact and high friction coefficients will be present. Operation of the hydrodynamic bearing after an oil system failure is rated as fair, since if the bearing cavity is designed properly to retain some oil, a measure of hydrodynamic operation can be maintained. With regard to their capability in very high speed designs, the hydrodynamic bearing possesses an additional capacity resulting from the higher speed, and hence has an advantage in this regard.

The hydrostatic bearing, like the hydrodynamic bearing, has essentially no limit on its operating life, provided it is designed so that no rubbing will occur during certain periods of operation. During starting and stopping with a self-driven lube pump running off an engine with which the bearing is used, the hydrostatic bearing must be rated as very poor because no load can be carried until sufficient speed is attained to increase the oil pressure to a load carrying level. However, the problem is not encountered with pumps driven separately from the power source. As with the hydrodynamic bearing, starting torque at low temperatures is quite high. Similarly, operation after a lube system failure is poor for the same reason that poor operation under start and stop conditions exist. Operation at high DN speeds can be expected to be good with the hydrostatic bearing, since its basic operation is not particularly dependent upon speed.

The hybrid bearing, which is basically a hydrostatic bearing, has also a hydrodynamic capability built into it, and is rated very much like the hydrostatic bearing with one exception. This is due to the capability of the hybrid bearing, at high speeds, to obtain some additional load capacity due to the hydrodynamic action.

Consideration of the overall pattern of characteristics shown in Table 1, along with the discussion above, suggests that the different rolling element and fluid film thrust bearing designs have both strong and weak characteristics. It, therefore, is apparent that by incorporating those strong design features of the various bearing types into a single structure, industry will have acquired a long sought thrust bearing capable of imparting longer life and increased reliability to rotating machinery and at costs less than that now experienced by manufacturers.

SUMMARY OF INVENTION

The present invention eliminates the above disadvantages inherent in prior art bearings by combining a rolling element bearing and fluid film bearing into a single assembly which takes advantage of the complementary characteristics of both types of bearings. In this proposed bearing design, hereinafter referred to as a hybrid boost bearing assembly, during transient starting or stopping operations, the load is carried almost exclusively by the rolling element bearing. As the speed of the bearing assembly increases, the load is gradually transferred to the fluid film bearing so that at rated speed, the fluid film bearing carries a major portion of the load and the rolling element bearing is essentially non-loaded. Likewise, as the speed decreases during operation, the load carried by the fluid film bearing is automatically shifted to the rolling element bearing until it eventually carries all of the load. As a result, the life of the hybrid boost bearing combination, as compared to prior art designs, is greatly extended. The rolling element bearing effectively prevents contact of the fluid film bearing surfaces and no undesirable rubbing or wear of these surfaces is, therefore, allowed to occur during starting or stopping. The overall design provides for low starting torques at low temperatures. In the event of a lube system failure, the full load automatically will be assumed by the rolling element bearing. Since the rolling element bearing under such emergency conditions will carry a relatively heavy load but will have a short life, the load should be reduced to a point less than the bearing's specific dynamic capacity and satisfactory operation for a period of a few hours will be possible, provided some lubricant is available for the rolling surfaces. When used in high-speed machinery, the unloading of the rolling element bearing permits the use of a very light series rolling element bearing arrangement, thus reducing centrifugal effects and increasing the life substantially over that of designs where the rolling element bearing must carry the full load all of the time.

It will be appreciated, therefore, that a hybrid boost bearing assembly according to the invention can be used in a wide variety of machine applications under a wide variety of bearing diameter, speed, load, and other conditions.

Accordingly, a primary object of the present invention is to provide a new and improved hybrid boost bearing assembly that combines a rolling element bearing and a fluid film bearing in a single assembly, and that is suitable for use as a bearing assembly in a wide variety of machine configurations.

Another object of the invention is to provide a hybrid boost bearing assembly of the above type wherein the load on the bearing assembly is assumed during rated load and speed by the fluid film bearing, and the rolling element bearing functions to carry the load only during transient starting, stopping or reverse thrust periods, and to provide an emergency capability in the event of a lube system failure so as to avoid any metal to metal contact in the fluid film bearing.

Still another object of the invention is to provide a hybrid boost bearing assembly which can entirely replace a comparable conventional rolling element bearing design such as an angular contact ball bearing through a one for one substitution due to the fact that the physical characteristics, size, loading capability, and the like, of the hybrid boost bearing assembly can be suitably designed in the form of a replacable package unit that can be inserted in place of the conventional rolling element bearing type formerly used.

A still further object of the invention is to provide a hybrid boost bearing assembly having the above characteristics which can be designed to accommodate shaft misalignment that might occur in an engine or other mechanism with which the bearing assembly is employed.

In practicing the invention, a hybrid boost bearing assembly is described for a rotating shaft member which is rotatably supported on a base member. The hybrid boost bearing assembly comprises a rolling element bearing for rotatably supporting the shaft member on the base member during starts, stops, reverse thrust loadings and under emergency operation conditions, and a fluid film bearing acting singly or co-acting with the rolling element bearing for absorbing the loads imposed on the shaft member during all other conditions of operation. A fluid lubricant supply is provided for supplying fluid lubricant to the bearings and means are provided for shifting the loading of the rotating shaft member from the rolling element bearing to the fluid film bearing as the rotating shaft member is brought up to its normal operating speed. The means for shifting the loading from the rolling element bearing to the fluid film bearing comprises fluid lubricant pressurizing means for increasing the thickness of the fluid film lubricant in the space between the opposed fluid film bearing surfaces formed by the bearing runner and stator, thereby causing the fluid film bearing to assume a greater share of the load of the rotating shaft as it is brought up to normal operating speed. As a result, the rolling element bearing will assume substantially the full load of the rotating shaft only during starting, stopping, reverse loading periods, and in the event of the failure of the fluid lubricant supply, while the fluid film bearing will absorb the shaft loads under all other conditions of operation. The fluid film bearing may comprise a hydrodynamic bearing for producing a self-acting fluid film, a hydrostatic bearing, or a hybrid hydrodynamic-hydrostatic bearing, and the rolling element bearing may comprise a ball bearing, roller bearing, needle bearing, or the like. In certain arrangements a preloading spring is provided for preloading the rolling element bearing a predetermined amount so that the rolling element bearing assumes a predetermined proportionate share of the loading on the rotating shaft under certain operating conditions. In other arrangements, a retractable bearing piston portion which moves towards and retracts from an opposed, load sustaining bearing surface is employed to cause the fluid film bearing to assume the load from the rolling element bearing. In other arrangements, a spherically-shaped self-aligning seat is provided which coacts with a complementary-shaped seating surface to accommodate misalignment in the rotating shaft supported by the bearing assembly.

In the several species disclosed the hybrid boost bearing assembly may comprise a thrust bearing, a radial bearing, a combination radial-thrust bearing, or a spherical bearing, depending upon the application desired.

BRIEF DESCRIPTIONS OF THE DRAWINGS

Other objects, features and many of the attendant advantages of this invention will be appreciated more readily as the same becomes better understood by reference to the following description, when considered in connection with the accompanying drawings, wherein like parts in each of the several figures are identified by the same reference character, and wherein:

FIG. 9A is an enlarged sectional view of an alternative design for the fluid film bearing unit used in the preload hybrid boost bearing assembly shown in FIG. 8, and which includes a spherically-shaped seat for accommodating shaft misalignment;

FIG. 10 is a partial sectional view of still another hybrid boost bearing assembly constructed in accordance with the invention, which includes a retraction type of fluid film bearing unit and that also is designed to accommodate shaft misalignment;

FIG. 11 is an enlarged sectional view of the retraction type fluid film bearing unit having shaft misalignment handling capability, and which is used in the hybrid boost bearing assembly shown in FIG. 10;

FIG. 12 is a plan view of the active thrust surface of a suitable fluid film bearing unit used in a hybrid boost bearing assembly constructed in accordance with the invention;

FIG. 13 is a partial sectional view of still another form of hybrid boost bearing assembly constructed in accordance with the invention, and which is of the retraction type but is designed in a manner to avoid warping of the load sustaining bearing surfaces;

FIG. 14 is a sectional view of a hybrid boost bearing assembly of the radial bearing type showing another form of such bearings;

FIGS. 15a, and 15c are diagramatic sketches of a suitable, preferred design for the active bearing surface employed in the fluid film bearing unit comprising a part of a hybrid boost bearing assembly according to the invention; and FIG. 16 is a diagramatic sketch of a spherical rolling element bearing which may be employed as the rolling element bearing in a hybrid boost bearing assembly according to the invention, and which would accommodate shaft misalignment in place of specially designing the fluid film bearing units for this purpose.

DETAILED DESCRIPTION OF PREFERRED EMBODIMENTS

Overall Hybrid Boost Bearing Assembly

Figure 1:
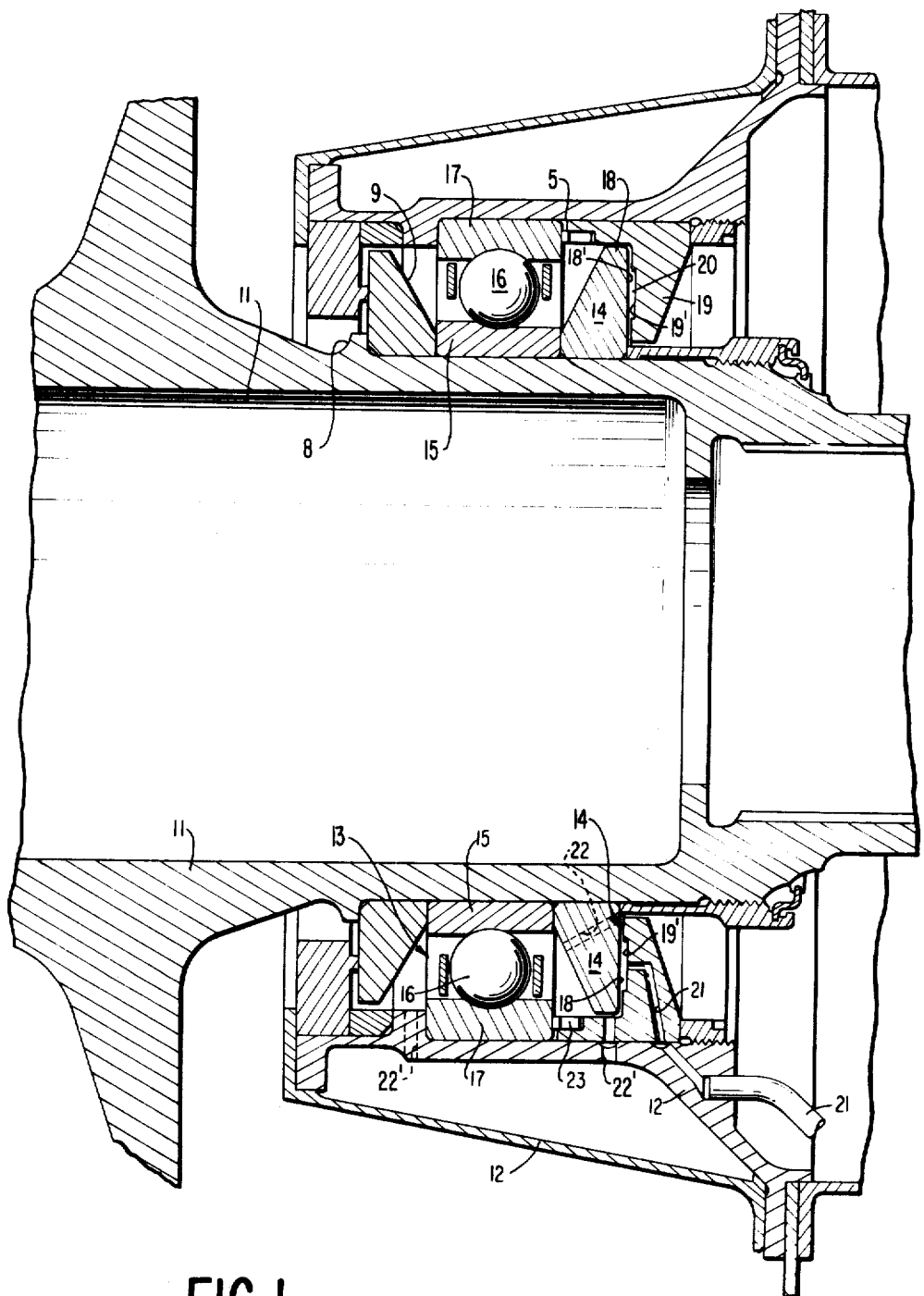
FIG. 1 is a sectional view of a hybrid boost bearing assembly constructed in accordance with the present invention, and suitable for use as a thrust bearing in rotating machinery.

FIG. 1 of the drawing illustrates one form of a hybrid boost bearing assembly constructed in accordance with the invention and which is identified as being a limited preload type. In this bearing arrangement, the shaft or other rotating component is shown at 11 and is rotatably supported on a base 12 by a hybrid boost bearing assembly constructed in accordance with the invention. The assembly comprises a rolling element bearing 13 and a fluid film bearing 14. The rotating parts of these bearing components are locked in place on the shaft by the cooperative action of an internally threaded ring 7 which urges the components against a projection or stop 8 formed on the shaft surface. The rolling element bearing assembly 13 comprises a conventional, angular contact, ball bearing having an inner annular race 15 secured to shaft 11 as by an interference fit, a plurality of circumferentially arranged bearing balls 16 and an outer race 17, the outer race 17 being slidable axially with respect to the base 12 so as to assume a floating state under varying load conditions, as more fully described hereafter.

The fluid film bearing 14 comprises a bearing runner 18 secured to shaft 11 and positioned in thrust load sustaining relationship with an opposed stator 19. The runner has a surface 18' designed for cooperation with a (not shown) through surface 19' formed on an annular collar on the stator. Lubricating oil is supplied from a pump (not shown) through inlets 21 to the space 20 between the oppositely disposed bearing surfaces 18' and 19'. Oil under pressure in the space 20 is discharged through passageway 22 to provide lubricating oil to the rolling element bearing unit 13. Oil discharge to the pump from both the fluid film and rolling element bearings may be made through the separate outlets 22' and 22''. Alternatively, oil to the rolling element bearing may be supplied directly from a separate source.

The stator bearing surface 19' circumferentially surrounds the shaft 11, and is supplied with oil through inlets 21 to feed grooves or pockets formed in the surface 19' in a manner to be described hereinafter with respect to FIG. 15.

In relatively low speed applications, the ball bearing outer race 17 is immovably fixed in the housing 12. During the early stages of shaft acceleration from standstill, the shaft moves axially in the housing 12 in response to the thrust forces imposed on it by the load. These forces are transmitted from the shaft surface to inner race 15 and through the balls 16 to the outer race 17 which then transmits the forces directly into the housing, or in a parallel path through the stator 19 to the housing. At this time, the fluid film bearing will be absorbing only minimal forces, or stated differently, will be carrying only a small fraction of the load because an oil pressure has not as yet been developed in space 20. However, within a matter of seconds after starting, sufficient pressure is developed in the fluid film bearing to carry the load previously transmitted through the ball bearing and the fluid film bearing then carries a major portion of the load. The unloading of the ball bearing and assumption of load by the fluid film bearing is accomplished by the pressure in space 20 causing the thrust runner to move in an axial direction toward the ball bearing, thus relieving it of the deflection which occurred when it carried the load. Under these circumstances, the space 20 will increase in width to a value which corresponds to the loads handled by the bearing assembly. The reverse action takes place as the speed of the shaft decreases. For high speeds it is desirable to construct the bearing assembly to have the outer race 17 float in the housing and move axially as the shaft reaction forces vary with speed. In the embodiment shown in FIG. 1, this is accomplished by providing a small space 5 during normal operation between the right side of outer race 17 and the stator 19. The design of the complete bearing assembly requires the rolling element bearing to carry all the load during starting and stopping, as previously described, and until a pressure of the desired magnitude can be established in the space 20 for counterbalancing the load forces. To accomplish this purpose and to prevent skidding of the balls in the ball bearing, a spring 23 is positioned between the outer race 17 and the stator to preload the bearing.

As the shaft starts to accelerate and thrust loads are applied in a direction from left to right as shown in FIG. 1, outer race 17 of the rolling element bearing 13, in responding to the load forces, will compress the spring 23 to the point where space 5 is consumed. Depending on the amount of preload desired on race 17, the assembly usually will be designed to permit the carrying of load forces by the spring up to about 400 lbs., although the value may be changed if desired. During this time, the fluid film bearing is merely rotating without performing any useful purpose. The forces generated by the load, are transmitted through the projection 8 on the shaft, the seal ring 9, inner race 15 and tangentially through the balls 16 and into the outer race 17. Since the outer race is designed for axial movement, it will slide axially, compressing the spring to the point where outer race engages stator 19 and the forces transmitted through the spring and stator shoulder are then directed through the stator 19 for absorption by the housing 12.

During the time the load forces are increasing during the acceleration period, a fluid pressure is generated and/or developed in the space 20 by the combined effects of pressure being furnished from an oil pressure source, such as a pump attached to the shaft or from a separate source, plus that pressure which is hydrodynamically generated in the space 20 where a hydrodynamic thrust bearing is used. As this pressure increases, the load forces will be transmitted to the housing through the ball bearing as previously described and in a second parallel path which includes the inner race 15 of the ball bearing, the fluid film bearing runner and across the space 20 into the stator for transmission to the housing 12. Further increase in the pressure developed in the space 20 causes the fluid film bearing runner to react to the pressures generated and move in an axial direction towards the ball bearing 13. In doing so, the deflection which previously occurred in the ball bearing is relieved, the spring starts to expand and a lesser amount of the load is transmitted through the balls 16 to the housing. Eventually, the pressure in space 20 will be of a sufficient magnitude to move the thrust runner a distance sufficient to counteract the initial ball bearing deflection and all the load is then transmitted from the shaft projection 8, seal ring 9, and the inner race 15 to the runner 18 where it then is transmitted across the space 20 to the stator 19 and the housing 12. In the preferred form, a slight load is always carried by the rolling element bearing to prevent skidding of the balls.

As for operation of the fluid film bearing 14, it will be understood from the previous description that as the thrust runner 18 rotates, it drags the liquid lubricant across the leading land as shown in FIG. 15 and since the pocket E is filled with lubricant, the drag exerted on the lubricant by the thrust runner compresses the oil in the pocket to a pressure which will correspond with the load carried by the thrust runner. Operation in this manner will continue until a reduction in the oil pressure in space 20 occurs and the outer race 17 of the ball bearing will again move axially as it is exposed to the forces which are transmitted through the balls for dissipation in the housing. A greater portion of the load then will be assumed by the ball bearing and it will handle all of the load as the shaft decelerates to standstill.

It will be apparent that in the event of failure of the lubricant supply to the space 20 a pressure will not be available to maintain the runner at a distance from the stator which corresponds with the load, and all of the load therefore will be transmitted through the ball bearing to the housing. This would constitute the emergency situation and since the balls 16 of the bearing would have sufficient lubricant, the bearing will operate effectively for a limited period of time, such as a few minutes to an hour which usually represents an amount of time within which the failure of the oil supply to the space 20 can be remedied.

The bearing design art has advanced to the point where the rolling element bearing 13 and the fluid film bearing 14 can be designed in such a manner that the loads carried by either of these bearing components can be defined in accordance with the wishes of the designer. In the particular design chosen to illustrate the concepts and structure of this invention, the rolling arrangement bearing 13 has been designed to carry approximately 25 percent of the load while the major portion of the load is carried by the fluid film bearing 14.

Figure 2:
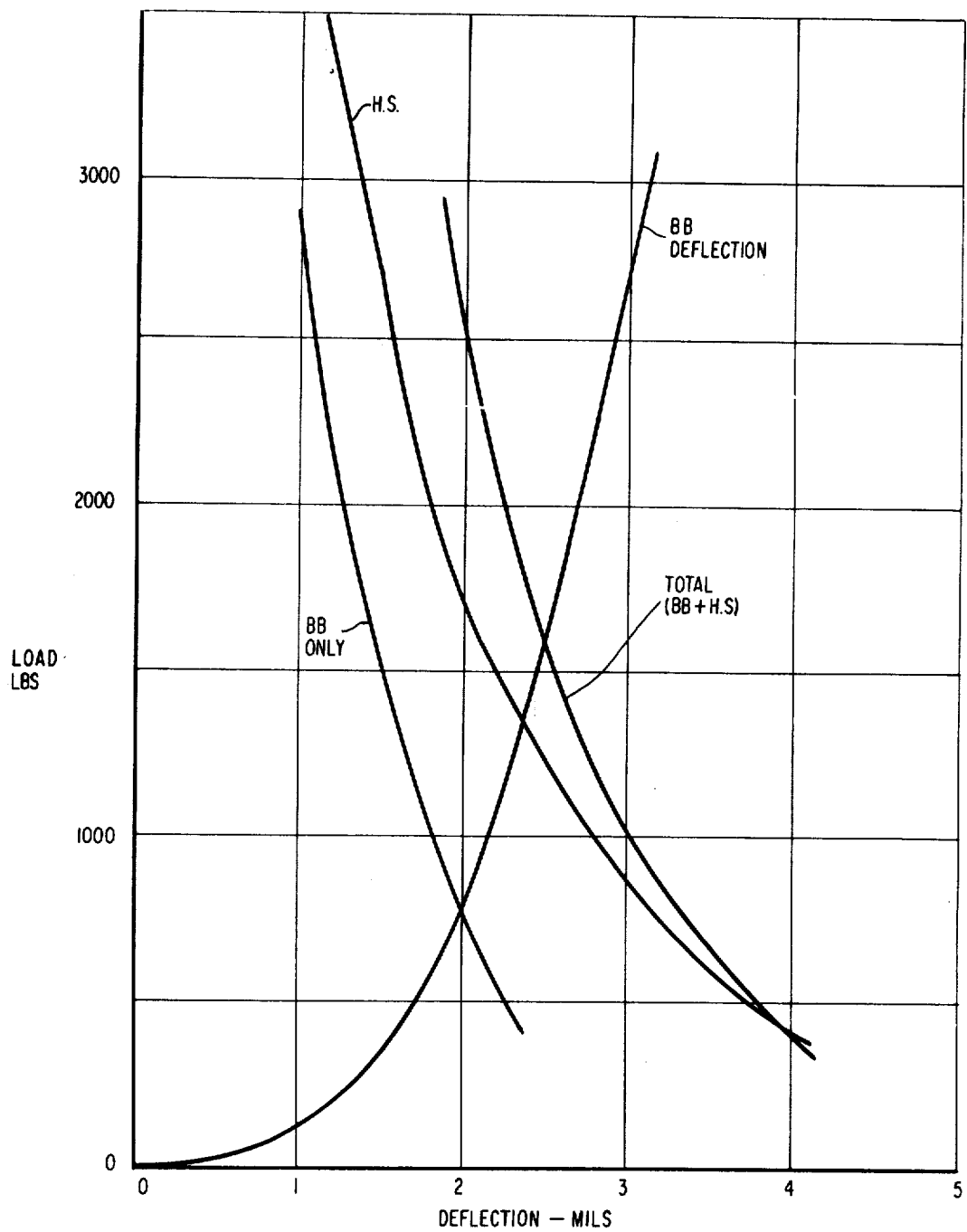
FIG. 2 is a plot showing the load deflection versus load characteristic of the hybrid boost bearing assembly illustrated in FIG. 1 and compares the characteristics of this bearing to conventional thrust bearing constructions.

An analysis of the loads which are imposed on the ball bearing and the fluid film bearing can be best appreciated by reference to FIG. 2 of the drawings, wherein the curve marked "BB only" represents the deflection that would be incurred by the rolling element bearing when subjected to a load. The curve marked "HS" represents the fluid film bearing load deflection with the load in pounds of thrust being plotted as the ordinate and the resulting deflection of the shaft 11 produced by this loading being plotted as the abscissa in mils. The curve marked total represents the sum of the two curves "BB only" and "HS," and also represents the overall performance of a hybrid boost bearing assembly such as shown in FIG. 1. If it is assumed that an operating point of 2 mil thickness for the lubricating film in the fluid film bearing is desired, then it will be seen by tracing up the 2 mil deflection line that a total load of 2,500 pounds thrust can be supported by the assembly of which 1,700 pounds is carried by the fluid film bearing, and 800 pounds is carried by the ball bearing. Accordingly, it will be appreciated that in this design, two-thirds of the load is carried by the fluid film bearing and only one-third of the load is carried by the ball bearing unit.

A particular advantage derived from utilizing a fluid film bearing design of the kind disclosed herein is that it can be substituted for a ball bearing in present multiple ball bearing installations. In the arrangement shown in FIG. 1, one of a duplex pair of ball bearings has been replaced by a fluid film bearing, and hence the load on the ball bearing has actually been decreased from 1,250 pounds to 800 pounds. Using the well-known cubic lifeload relationship, the life of the ball bearing unit in this design will be increased by a factor of (1,250/800) which is equal to 3.8. This is a substantial increase in the expected operating life of the ball bearing over that of a duplex bearing operating at the same conditions.

In the event that the lube system should fail while the bearing assembly is under full load, the load carried by the fluid film bearing will fall back on the ball bearing, and reference to the FIG. 2 curves will show that the fluid film bearing thickness would be reduced to 1.1 mils. It is important to note that even under these conditions, there is still sufficient separation of the fluid film bearing surfaces 18' and 19' so that fail-safe operation is achieved. As is well-known in the art, different designs of fluid film bearings are used for different applications in order to obtain the maximum benefits in the rotating equipment. The following example illustrates the flexibility in the hybrid boost bearing design disclosed herein, wherein a different design of fluid film bearing can be used to have it carry a greater portion of the thrust forces. FIG. 1 shows a fluid film bearing of planar design. Should a conically-shaped fluid film bearing be substituted for the planar type of FIG. 1, substantial improvement in the operating characteristics of the hybrid boost bearing will be realized. The conically-shaped bearing has a greater capacity to carry heavier loads and the space between the fluid film bearing runner and the stator can be made larger. Referring to FIG. 2, it will be seen that a load of 1,650 pounds would be carried by a fluid film thickness of approximately 2.5 mils. Under these conditions, the fluid film bearing would be carrying 1,250 pounds and the ball bearing would carry only 400 pounds. The fatigue life improvement factor with such a design would then be $(1,250/400)^3 = 30$. The magnitude of this fatigue life increase dramatically illustrates the substantial improvement in operating characteristics' that can be obtained with the hybrid boost bearing assembly made available by the invention.

Hybrid Boost Bearing Design and Fluid Film Bearing Geometry

The fluid film bearing unit 14 of FIG. 1 may be of either the hydrostatic or hydrodynamic type, or it may be a hybrid combination hydrostatic-hydrodynamic design. Although it is well known that a number of specific bearing designs fall within these broad types, the tapered land design of hydrodynamic bearing is particularly suitable for use in machinery where high thrust forces are encountered. A shrouded step design, to be described more fully hereinafter in connection with FIG. 15, also is applicable to high thrust engines because of its combination of good hydrodynamic action with a hybrid capability. In addition, the shrouded step bearing design is fairly insensitive to wear which provides an additional safety factor from a fail-safe point of view.

FIG. 15 of the drawings illustrates certain of the details of a suitable shrouded step thrust bearing design for use in the hybrid boost bearing assembly shown in FIG. 1. In FIG. 15 only one pad of the thrust bearing stator is illustrated in plan and profile, although it will be understood a number of such pads of the same general shape are arranged in a circular array on the annular bearing surface 19' and are designed to coact with the bearing runner surface 18'. Each pad contains a pocket area P of length E and width L which is depressed by an amount $(h_2 - h_1)$ below the otherwise uniformly flat top surface of the bearing 19 as shown in FIG. 15C. An area or air oil supply passage 20' may be provided between each pad as shown in FIG. 15C. During operation, motion of the runner drags fluid from the inlet 21 FIG. 1 across the depressed step pocket area P toward the termination of the pocket at the step. In this manner, fluid pressure is developed along the pocket, reaching a maximum at the step and decreasing over the trailing land. The supply pressure plus the pressure thus generated by hydrodynamic action reaches an amount where it equals or exceeds the load imposed on the bearing by the shaft and the runner therefore seeks a position which corresponds with the thrust forces. The side lands of width $b$ serve to limit side flow from the bearing and hence increase its pressure generating capability. There is an optimum width for the lands $b$ which normally is about one-sixth of the total bearing width. For a more detailed disclosure of the manner in which this hydrodynamic pumping and pressurizing action takes place, reference is made to the textbook by Wilcock and Booser entitled, "Bearing Design and Application", 1957 edition, McGraw-Hill Book Company, publishers.

Although the hybrid boost thrust bearing can be applied to a multiplicity of machine and equipment applications having a wide variety of bearing diameters, speed and thrust load conditions, the following example shows in a practical way, how the teachings of the invention may be applied to a high speed jet engine. Considering a jet engine of approximately 2,500 lbs. thrust, the rolling element bearing comprises an angular contact ball bearing having a bore size of 140 mm, an outside diameter of 210 mm, and a width of 33 mm. It is assumed that this bearing will run at a normal engine speed of 8,000 rpm, and is lubricated with a MIL-7808 diester oil having a viscosity of 4.2 centipoises at the normal operating temperature of the engine. The usual construction of this size engine utilizes a stack of two angular contact bearings. However, one of the angular contact bearing units is replaced with a fluid film bearing unit 14 of the type described and shown in FIG. 1.

Assuming the use of a hydrodynamic type of fluid film bearing in the assembly, the annular bearing surface has an outside diameter of 7.880 inches and an inside diameter of 5.900 inches. In the annular bearing surface provided within this space, 10 pockets are formed, each having a step length E of 1.38 inches and a step width L of 0.59 inches. The side lands and the end lands width are 0.20 inches, and a step depth of 0.007 inches is suitable. A conventional feed restrictor is placed in series with the bearing to limit the flow at low loads when the film thickness is large and to increase the bearing stiffness. Flow of lubricant under these conditions varies from a very small amount at low load to a maximum of 10 gallons per minute at full load. Oil pressure at the pump is 100 psi at the nozzles to the bearing.

From the foregoing description, and from a consideration of FIG. 1 taken in conjunction with FIG. 15 of the drawings, it will be seen that the hybrid boost bearing assembly shown in FIG. 1 functions in the following manner. Assuming the condition where lubricant from an appropriate source is available for supply to the bearing, as the shaft 11 commences to rotate from standstill, the load at any instant at low shaft speeds will be assumed completely by the rolling element bearing unit 13. Lubricant trapped in the roller element bearing through appropriate design of this unit in the previously discussed manner, serves to lubricate the rolling element bearing. Thereafter, as the shaft 11 is brought up to speed, the lubrication supply system attains its operating pressure, which, as earlier indicated, is in the order of 100 psi with 50 psi being delivered to the nozzles supplying the pockets P in the bearing surface 19'. The lubricant at this pressure head provides some measure of hydrostatic operation; however, it is mainly through the hydrodynamic pumping action previously described with respect to the pockets P that the fluid film bearing 14 begins to assume load from the rolling element bearing unit 13. As this occurs, the lubricant fluid film builds up in the space intermediate the land areas on bearing surfaces 18' and 19'. As previously indicated, the film thickness at normal operating speeds of the shaft is approximately 2 mils. Upon reaching this point in the operation, the fluid film bearing 14 has assumed approximately two-thirds of the total thrust load on the hybrid boost bearing assembly. Under these conditions, the pressure of the lubricant in the pockets 20 is in the neighborhood of 500 to 2,000 psi as determined by the thrust load.

The transfer of the thrust loading on the shaft 11 from the rolling element bearing unit 13 to the fluid film bearing unit 14 occurs by reason of the fact that the increasing lubricant film thickness in the space between the bearing surfaces 18' and 19' causes these surfaces to support more and more of the thrust load. As this occurs, the ball bearing outer race 17, which is free to move along an axis extending in the main loading direction parallel to the center line of the shaft 11, slides axially under the load. The preloading spring 23 however serves to maintain some thrust load on the rolling element bearing 13 at all times in order to avoid ball skidding. Upon compressing the preloading spring 23 to this extend, the roller element bearing butts against the stator 19 of fluid film bearing 14 and can no longer move axially. Consequently, during startup, the rolling element bearing 13 will assume substantially the full thrust load of shaft 11 until such time that the shaft is brought up to speed and the fluid film thickness builds up in the space between the bearing surfaces 18' and 19'. Thereafter, as shaft 11 approaches its normal speed, the increasing thickness fluid film will assume the load and the rolling element bearing 13 will be substantially unloaded so that the greater portion of the load will be supported on the fluid film bearing. Thus it will be appreciated that at least a portion of one of the bearings (either the rolling element bearing 13 or the fluid film bearing 14) is movably supported relative to the base member and the rotating shaft member so that it can move along an axis extending in the main loading direction of the rotating shaft member for movement into and out of load assuming relationships by reason of the increasing thickness fluid lubricating film as the rotating shaft is brought up to speed. From this description, it will be appreciated further that by appropriate control of the pressure of the fluid lubricant in the space between the bearing surfaces 18 and 19, the fluid film bearing can be made to assume any desired share of the load. Such control may also be achieved by appropriate design of the clearances between the bearing surfaces 18 and 19.

Figure 3:
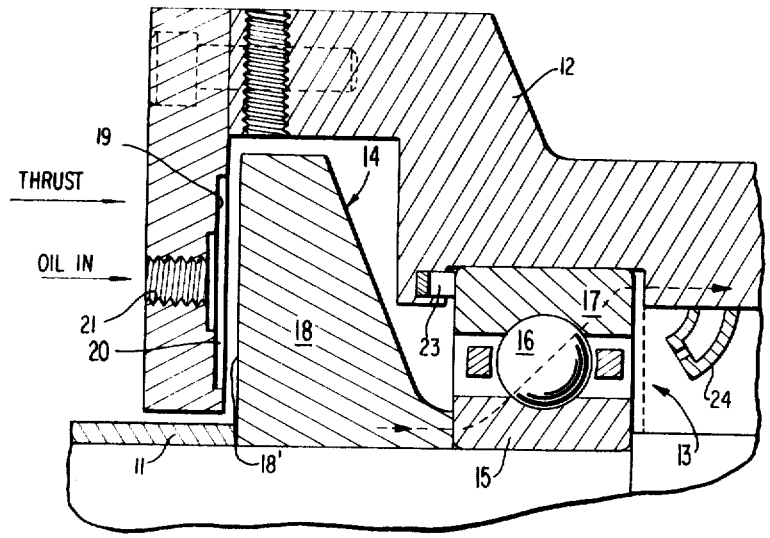
FIG. 3 is an enlarged sectional view of the hybrid boost thrust bearing constructed in accordance with the invention.

FIG. 3 of the drawings is an enlarged, partial sectional view of a preloaded hybrid boost bearing assembly similar to that employed in the bearing arrangement shown in FIG. 1. Reversal in position of the rolling element bearing and the fluid film bearing is shown to illustrate that the relative location of these units is unimportant. Accordingly, the positions of these units may be reversed in order to adapt the hybrid boost bearing assembly to any particular application where needed. Additionally, it might be noted that in the arrangement shown in FIG. 3, a separate source of lubricating oil indicated at 24 is provided for supplying lubricating oil to the rolling element bearing unit 13. Another feature illustrated in the hybrid boost bearing assembly of FIG. 3 makes clear that the fluid film bearing unit need not necessarily be designed to fit within the physical space normally provided to accommodate a pair of rolling element bearings as in the prior art. If additional space is available, or if a particular application suggests the need for a larger fluid film bearing preferably should be designed to utilize all of the available space, thereby permitting it to assume an even greater percentage of the shaft loading under normal operating conditions.

Figure 4:
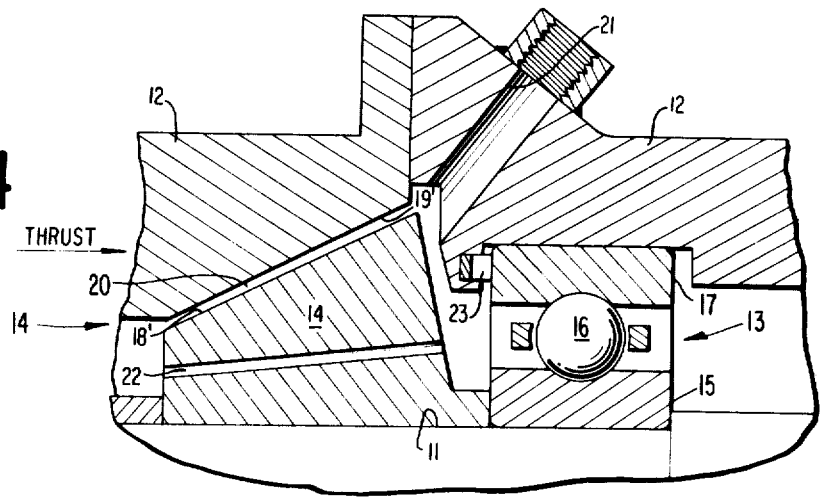
FIG. 4 is a partial sectional view of a hybrid boost thrust bearing having a conically-shaped bearing surface, and constructed in accordance with the invention.

FIG. 4 of the drawings illustrates a hybrid boost bearing assembly constructed in accordance with the invention wherein the opposed bearing surfaces 18' and 19' of the fluid film bearing unit 14 are designed to be conically shaped so that they can support both radial and thrust loading. As mentioned earlier, by so conically shaping the opposed fluid film bearing surfaces 18' and 19', the fluid film bearing unit can assume an even greater proportion of the shaft loading, thereby unloading the roller element bearing 13 to a greater extent and further improving its expected operating fatigue life. In addition, by conically shaping the fluid film bearing surfaces 18 and 19 in the manner shown in FIG. 4, some misalignment of the shaft 11 can be accomodated.

Figure 5:
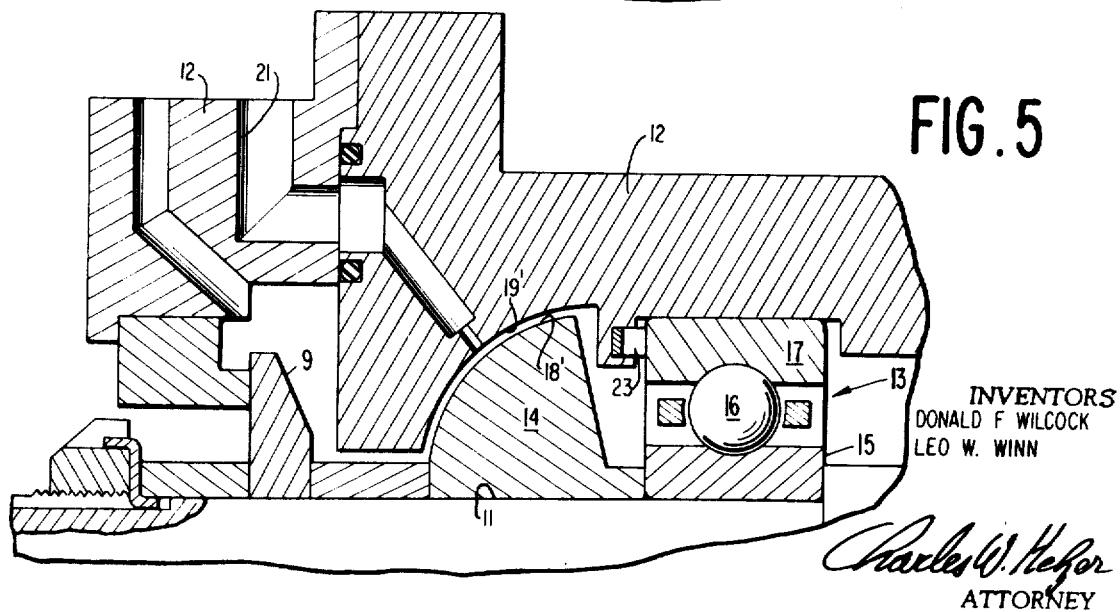
FIG. 5 is a partial sectional view of a hybrid boost thrust bearing having a spherically-shaped fluid film bearing surface and constructed in accordance with the invention.

FIG. 5 of the drawings illustrates a hybrid boost bearing assembly where in the opposed bearing surfaces 18' and 19' are spherically-shaped and complementary-shaped, respectively, in order to provide the several additional advantages enumerated above with respect to the conically shaped species of the invention shown in FIG. 4. It might be further noted with respect to the species of the invention shown in FIGS. 4 and 5, that due to their respective conical and spherical bearing surface configurations, these assemblies can accommodate a substantial amount of radial loading in addition to the thrust bearing load imposed on them.

Figure 6:
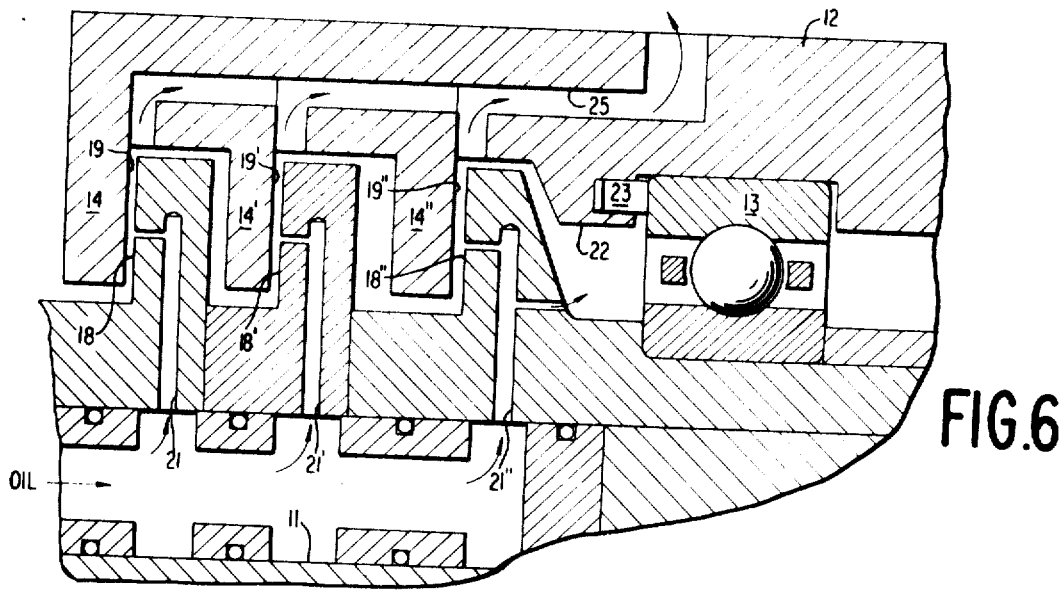
FIG. 6 is a partial sectional view of a hybrid boost thrust bearing constructed in accordance with the invention, and which employs a multiplicity of serially arranged fluid film bearings.

FIG. 6 of the drawing illustrates an embodiment of a preload hybrid boost bearing assembly constructed in accordance with the invention which includes a plurality of serially arranged, circumferential fluid film bearings 14, 14' and 14'' acting in combination with a single rolling element bearing unit 13. In the multiple series, fluid film bearing arrangements of FIG. 6, lubricating oil is supplied from the rotating shaft member 11 through a plurality of passageways 21,21', and 21'' to the surfaces 18,18' and 18'' of the runners on which suitable pockets are formed as described in relation to FIG. 15, to provide the desired hydrodynamic fluid pumping action necessary to create the desired increasing thickness lubricant fluid film. This is just the reverse of the arrangement shown in FIG. 1 wherein the pockets were formed on the stator bearing surfaces 19,19' and 19'', and merely serves to illustrate the versatility of design choice available with the present invention. Lubricant supplied to the spaces between the bearing surfaces 18, 18' and 18'' and 19, 19' and 19'', respectively, may be discharged out of an exhaust passageway 25 or through an alternate passageway 22 to lubricate the rolling element bearing 13, and from there, to a sump or pump (not shown). In operation, the preloading spring 23 serves to preload the rolling element bearing 13 a predetermined amount so that it will assume a known, proportionate share of the loading even after the bearing assembly has been brought up to speed, and the fluid film bearing surfaces of all three serially arranged fluid film bearings have assumed their designed proportion of the load.

Radial Bearing Type Hybrid Boost Bearing Assembly

Figure 7:
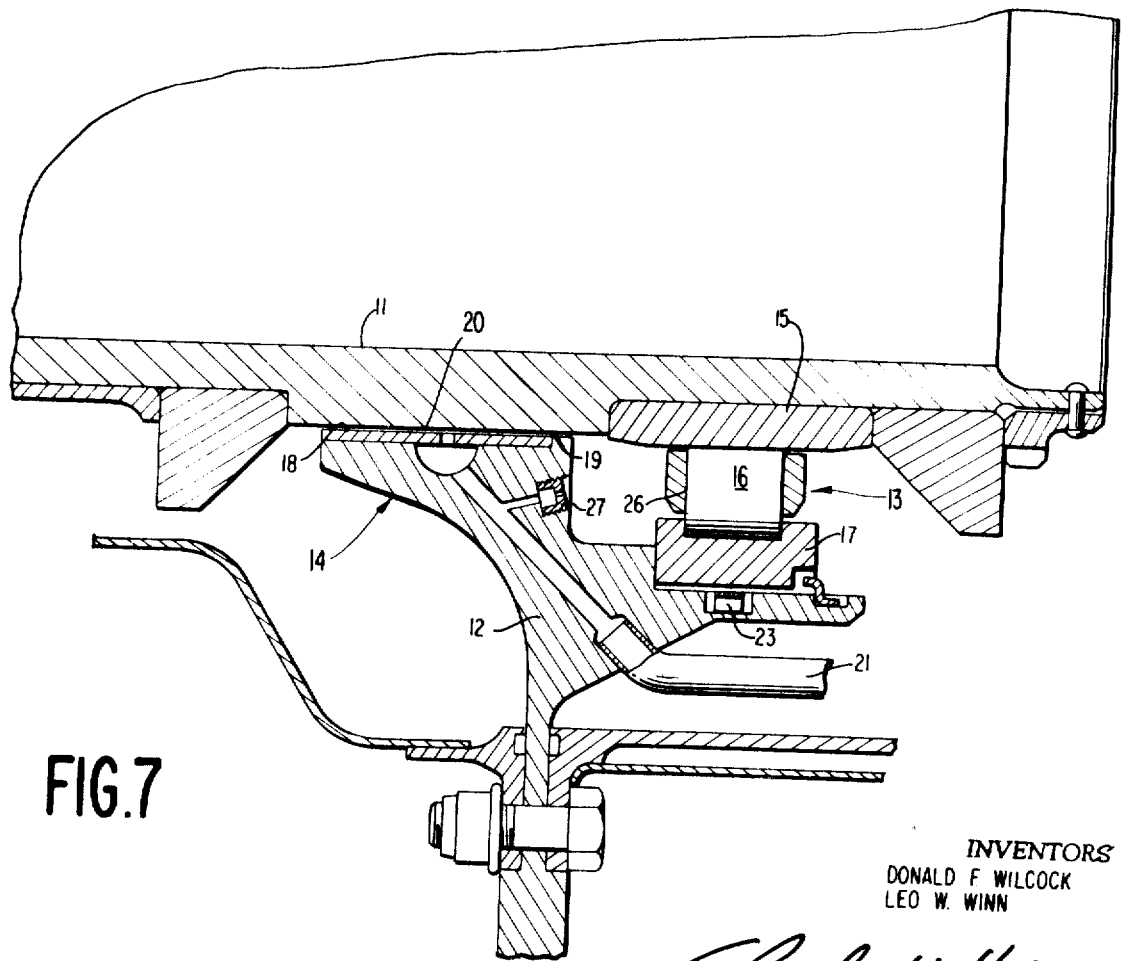
FIG. 7 is a partial sectional view of a hybrid boost radial bearing constructed in accordance with the invention which employs a cylindrical roller bearing as the rolling element bearing of the combination.

FIG. 7 of the drawing is an enlarged, sectional view of a portion of a hybrid boost bearing assembly designed for supporting radial loads. The bearing assembly shown comprises a roller bearing unit 13 formed by an inner race 15 secured to the rotating shaft 11 and an outer race 17 secured to the supporting member 12 and having a plurality of circumferentially arranged, cylindrically-shaped roller elements 16 rotatably secured therebetween. Supported adjacent to the roller bearing 13 is a fluid film bearing unit 14 comprised by a journal 19 having a surface formed on the outer surface of the rotating shaft 11 and that constitutes the runner of the fluid film bearing 14. The journal or runner 19 confronts a stator 18 which may have a plurality of pockets and coacting lands (not shown) formed therein in the manner depicted in FIG. 15 of the drawings. Fluid lubricant is supplied through the inlet opening 21 to the space between the bearing portions 18 and 19. Fluid lubricant is supplied to the rolling element bearing 13 from supply line 21 through a pressure dropping orifice shown at 27. A preloading spring 23 serves to preload the rolling element bearing 13 to cause the outer race 17 to normally engage the rolling elements 16 while the shaft 11 is in the stopped or non-operating condition.

In operation, the shaft starts to accelerate, the load forces on the shaft are transmitted through the inner race 15, rollers 16, outer race 17 and spring 23 to the housing inducing eccentricity (radial displacement from the concentric position) between shaft 11 and sleeve 18. Simultaneously, fluid lubricant is supplied through the line 21 and supply passages formed in the pockets of the fluid film bearing sleeve 18 to the space between the two surfaces 18' and 19'. This occurs during the shaft acceleration period and as the shaft approaches its normal operating speed, the oil pressure in space 20 between the fluid film bearing runner and stator, increases and gradually assumes part of the total radial forces. Continued application of radial load causes full compression of spring 23 and as a consequence of the increasing eccentricity between the runner 18 and stator 19, load will be shifted from the rolling bearing element 13 to the fluid film bearing 14. Nevertheless, because of the presence of the preloading spring 23, some predetermined proportionate share of the load on the shaft 11 will always be assumed by the roller element bearing 13 even after the shaft 11 has attained its normal operating speed, the purpose being to prevent the rollers 16 from skidding and to provide a compact structure. Thereafter, during stopping, or in the event of a lubrication system failure, should the minimum thickness of the fluid film between the bearing surfaces 18 and 19 decrease, the rolling element bearing 13 will commence assuming an even greater proportion of the load, up to full load, until the shaft 11 is stopped or the lubricating system again placed in operation.

FIG. 14 shows still another form of radial load sustaining hybrid boost bearing assembly according to the invention which employs exhaust oil from the fluid film bearing 14 unit to lubricate the rolling element bearing 13, and also employs a bearing sleeve 18 the bore of which is intentionally machined so as to provide built in eccentricity between sleeve 18 and runner 19. In cases of unidirectional load application, the eccentricity of the sleeve bore with respect to rotor is positioned in such a manner that the resultant load vector of the pressured distribution generated by hydrodynamic action is in line with but in direction opposite to the external load vector. Otherwise, the arrangement operates in the same manner as FIG. 7. As shown by the arrows, after the oil supplied through passages 21 serves its lubricating function in the fluid film bearing, it is discharged into a manifold M which acts as a distribution chamber for delivering the oil to the rolling element bearing. It desirably is metered into the bearing through appropriately located orifices and the excess returned to a sump or pump (not shown) through outlets 25.

Retraction Type Hybrid Boost Bearing Assembly

Figure 8:
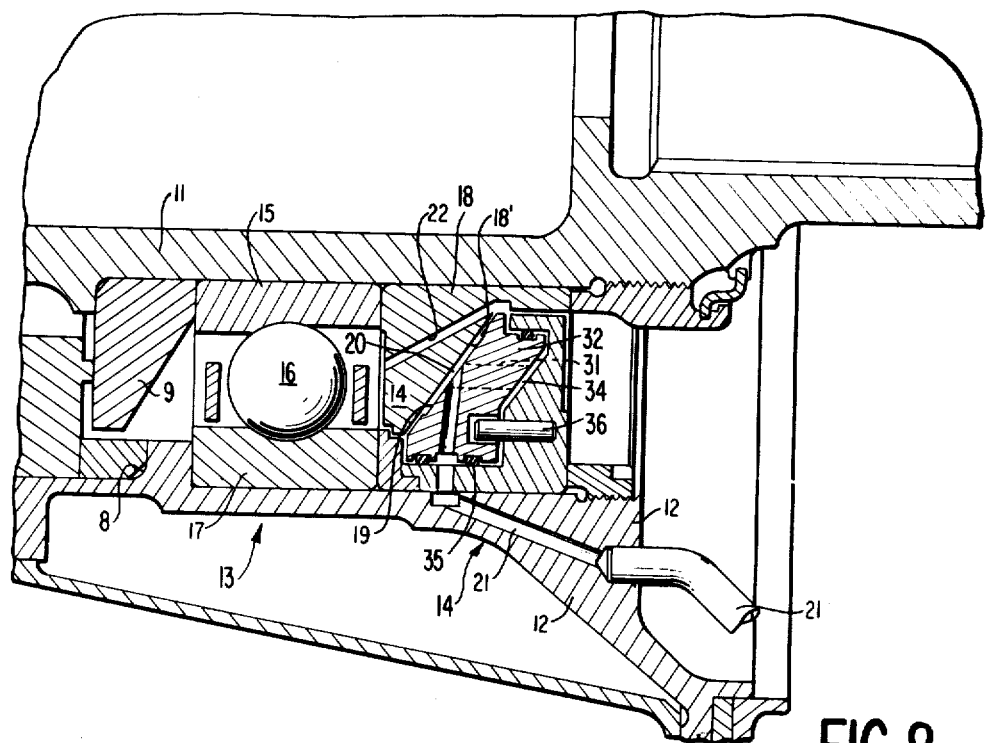
FIG. 8 is a partial sectional view of a hybrid boost bearing of the preload type which includes a preloading spring.
Figure 9:
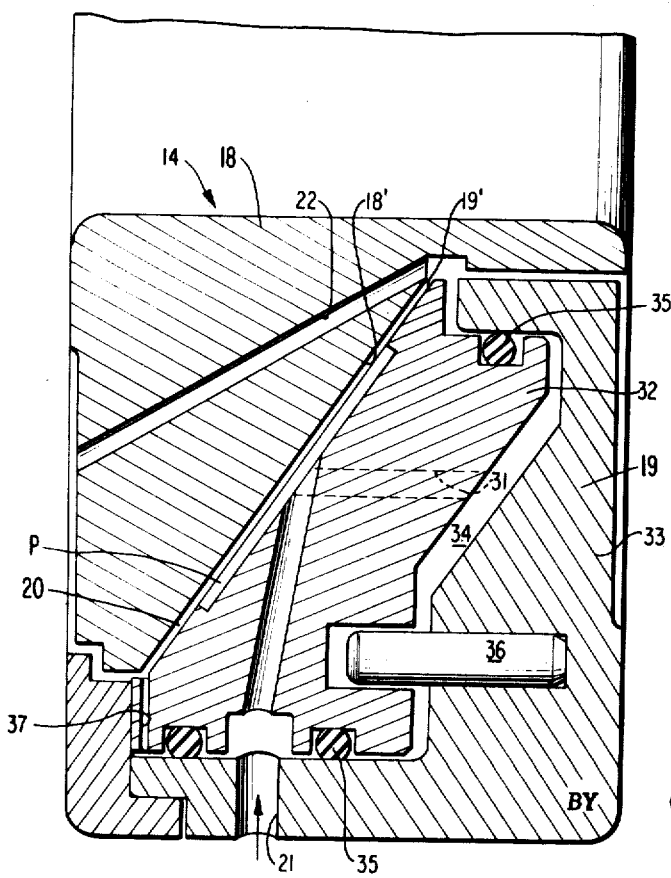
FIG. 9 is an enlarged sectional view of the fluid bearing portion of the preload hybrid boost bearing assembly shown in FIG. 8.

FIGS. 8 and 9 of the drawings illustrate a partial sectional view of a retraction type, hybrid boost bearing assembly constructed in accordance with the invention. The retraction type shown employs an angular contact rolling element bearing 13 having its inner race 15 secured to the rotating shaft 11 and its outer race 17 secured to the base member 12. The bearing 13 coacts with a fluid film bearing 14 having a runner 18 keyed to the shaft 11 and therefore rotatable with the shaft. The runner bearing surface 18' coacts with stator bearing surface 19' in which pockets and lands (not shown) are formed to provide a hydrodynamic pumping action as described previously with relation to FIG. 15. This hydrodynamic pumping action causes the fluid film in the space 20 between the surfaces 18' and 19' to build up to a predetermined thickness, concurrently with the establishment of pressure in the fluid in this space, due to the self-acting, pumping nature of the hydrodynamic bearing surface.

FIG. 9 is an enlarged sectional view of the fluid film bearing unit 14 shown in FIG. 8. As best seen in FIG. 9, the high pressure fluid lubricant developed in the space 20 between the bearing surfaces 18' and 19' is supplied through an inlet port 21 formed in a moveable piston 32 of the fluid film bearing unit. The moveable piston 32 is of ring-like configuration and comprises a part of stator 19. It is seated within and coacts with an immovably fixed backing member 33 to define a space or cavity 34 with which the port 21 communicates through duct 31. The space 34 is sealed off by annular 0 rings 35, or other appropriate sealing devices, so that the high pressure fluid lubricant introduced into the space 34 through the duct 31 is caused to act against the exposed surfaces on backside of the moveable piston 32.

The design of the fluid film bearing unit shown in FIG. 9 is such that the integral of the exposed surface on the backside of the movable piston 32 times the fluid lubricant pressure developed in the space 34 exceeds the integral of the fluid lubricant pressure in the space between the surfaces 18' and 19' multiplied by the exposed bearing surface in this space, plus the force exerted by spring 37. As a consequence of this design feature, upon the bearing unit being brought up to speed, the pressure of the fluid lubricant in the space 34 will cause the moveable piston 32 to move to the left as viewed by an observer of FIG. 9, thereby bringing the bearing surfaces 18' and 19' into load assuming relationship. When the bearing unit is not up to operating speed, a retraction spring 37 acts on the moveable piston 32 to keep the bearing surface 19' back out of load assuming relationship. This retraction capability avoids rubbing contact between the bearing surfaces 18' and 19' in the event of an oil system failure, or during stopping or starting. A pin 36 prevents relative rotation between the stator parts comprising the piston 32 and the backing member 33 to assure proper alignment of the oil supply ports while allowing relative axial movement.

In operation, lubricating oil is admitted through the inlet port 21 to the feed grooves in the shrouded step pockets formed on the bearing surface 19'. Due to the self-acting nature of the bearing surface while shaft 11 is rotating, lubricant in the space between runner 18 and stator 19 is pressurized and is conducted through duct 31 to the cavity 34 between the moveable piston 32 and the backing member 33. The total forces in the cavity area 34 (i.e. pressure times area) acting on the back side of piston 32 is greater than the total force acting on the bearing surface 19', plus spring load, and hence the piston 32 is driven against a spring 37 compressing the spring to a full stop. The stop precludes contact between the bearing surface 19' and bearing surface 18'. Under all operating conditions the rolling element bearing 13 shown in FIG. 8 therefore assumes the full load during the initial stages of starting and until sufficient pressure is established in space 20 by the combination of oil supply pressure plus that developed by the hydrodynamic action of surface 19'. As the space 20 pressure increases, the fluid film bearing 14 assumes a greater portion of the load and as the shaft reacts to the counter-balancing forces of the fluid film bearing, it moves axially in the reverse direction and unloads the rolling element bearing, although it still will carry a small part of the total load forces. The reverse action occurs as the shaft decelerates to standstill. In the event of an oil system failure, or lack of oil supply, the retraction spring 37 will pull the moveable piston 32 back increasing the gap between fluid film surfaces 18' and 19', so as to avoid rubbing contact between the relatively moving parts.

By designing the parts to small clearances, 0-rings 35 may be omitted and sufficient pressure can be developed in the cavity 34 to move the piston 32 to a position to effectively carry the load. In this modified construction, oil is supplied from port 21 directly to space 20, then through duct 31 to space 34. The differential forces on opposite sides of piston 32 drives it toward bearing surface 18' and against stop 37. As pressure is generated by the stator surface 19', it will be reflected in space 34 and the piston therefore will seek a position corresponding to the forces on its opposite sides. To permit retraction of piston 32 in the event of failure of the oil supply, spring 37 may be retained in the same position or it may be located in the same slot as pin 36 which serves to prevent relative movement between the stator parts. When positioned in the same slot as the pin, the spring will be connected to the parts so as always to be in tension, rather than compression, as shown in FIGS. 8 and 9. A benefit gained from using the spring arrangements described is that the rolling element bearing outer race may be immovably fixed in the housing.

Retraction Type Hybrid Boost Bearing Assembly Having Misalignment Capability

The unusual design of the hybrid boost bearing assembly permits accommodating substantial and variable thrust loads, and in addition, provides the important advantage of an aligning capability in the fluid film bearing of any misalignments which may occur in the structure. By reason of the misalignment capability possessed by the fluid film bearing shown in FIG. 9A, deflection of the bearing housing, shaft deflection, or the like, can be accommodated without misalignment of the fluid film bearing surfaces of the hybrid boost bearing. A self-aligning seat shown generally at 41 is provided for handling such misalignment and comprise a spherically-shaped seating surface 42 coacting with a complementary-shaped seating surface 44 formed on the moveable piston 32. In the embodiment of the invention shown in FIG. 9A, the piston comprises two parts 32 and 43 with the spherically-shaped seating surface 42 being formed on the face of part 43 opposing the complementary shaped surface 44 formed on the part 32. The fluid film bearing surface which sustains the load is formed on the face 19' of the part 43 and coacts with the bearing surface 18' of the runner that is keyed to shaft 11. Suitable restraining pins 36 prevent relative rotation of the piston 32 although the part 43 is free to move the spherical seating surface 42 relative to the complementary seating portion 44 formed on the face of moveable piston 32 in order to adapt the fluid film bearing unit to misalignments. Retraction springs (not shown) cause the parts 32 and 43 to retract away from the runner bearing surface 18 in the absence of fluid lubricant.

Lubricating fluid is admitted through the port 21 into the spherical seat cavity 41 and then is conducted through a port 45 to the oil feed groove in the shrouded step thrust bearing surface 19'. The high pressure oil developed in the region between the bearing surfaces 18' and 19' in the shrouded step bearing is conducted through another port 46 (shown in dotted outline) formed in the second part 43 of the piston, and through the passageway 31 formed in the first part 32 of the piston to the cavity 34 between the piston and the backing member 33. In this manner, load is applied to the bearing surface 19 by moving piston parts 32 and 43 into load sustaining relationship as described previously in connection with the bearing design shown in FIG. 9.

The spherical seat 41 has pockets formed by lands 47 which seal the sides of the pockets and form a step seal that assures a constant thickness film being formed over the entire space between the spherical seating surfaces 42 and 44 in a well known manner. This step seal configuration can be so designed that the film thickness over the entire spherical seat is approximately 0.5 mils.

From the above description of FIG. 9A, and the preceding description of FIG. 9, it will be appreciated that considerable utilization can be made of the pumping capability of the shrouded step bearing with a flow of lubricant being withdrawn at the step bearing surface. Reasonable quantities of oil, for example, about 10 percent of the total flow, may be extracted without significant influence on the bearing load capacity of these designs.

Hydrostatic Hybrid Boost Thrust Bearing Assembly

The hybrid boost bearing concept is also readily applied to heavily loaded, low-speed, flexible shaft machines as exemplified by the roller thrust bearings of a helicopter, for example. In such applications, the hybrid boost bearing assembly utilizes a fluid film bearing to assume the major share of the load from a tandemly arranged rolling element bearing or bearings, thereby greatly increasing the fatigue life of the overall bearing assembly. In such applications, hydrostatic fluid film bearings are preferred because of the low rotary speed. Additionally, special features providing misalignment capability and a retraction fail-safe capability, also are included. Because of the nature of the application, the hydrostatic hybrid boost thrust bearing thus provided is physically designed to be accommodated within a space provided for a previously used rolling element thrust bearing arrangement, and may be used as a one for one, a two for one, etc., replacement of the previous rolling element thrust bearing assemblies.

The main rotor thrust bearing of the type used in a helicopter, for example, illustrates a typical load and speed application for a hydrostatic, hybrid boost bearing made available by the invention. In helicopter installations of relatively large size, the thrust bearing must sustain a normal thrust load of about 10,000 pounds, and during maneuvering, this load may be increased by approximately three times to a total of 30,000 pounds, or it may be in the reverse direction by as much as 5,000 pounds. A normal radial load of 8,000 pounds is imposed on the structure as a result of a moment on the upper end of the helicopter shaft arising from the vertical load reactions of the rotor blades. This moment, which is about 100,000 inch/pounds, results in the above radial load when considering the distance apart of the upper rolling bearing and the lower combined radial and thrust bearing. The radial load under maneuvering conditions may also be increased by a factor of three. In addition to the above listed loads, there may be an additional horizontal maneuvering load of from 700 to 800 pounds. The speed of the shaft is almost constant at 285 r.p.m. Due to the large bending moment introduced into the shaft, as described previously, from the vertical rotor blade reactions, the shaft is deflected to such a degree that the calculated slope of the shaft centerline through the lower bearing will amount to approximately 0.000825 inches per inch. This particularly results in additional localized loading on the lower thrust bearing. A typical lubricant system utilizes an MIL-L23699 lubricant, with a viscosity temperature characteristic of about 7.0 Centistokes at a temperature 185°F, and oil is supplied to the system at a rate of 7½ gallons per minute at a pressure of about 40 psi.

To acquire a perspective on the importance of this invention, it will be appreciated that the main rotor thrust bearing used in an application of the type described above, utilizes an opposed pair of tapered roller bearings, and in order to provide additional load capacity, a stack of three angular contact ball bearings are fitted in the same envelope dimensions. Two of the three angular contact ball bearings comprise an opposed pair in order to take the reverse thrust and to limit axial motion, and the third ball bearing works in tandem with one of the opposed pair to carry the normal vertical vehicle load. These bearings also carry the radial load, and are subjected to the angular shaft misalignment mentioned above.

FIG. 10 of the drawings illustrates the application of the hybrid boost bearing concept to this situation.

Reference to FIG. 10 shows that one of the three ball bearings has been replaced with a hydrostatic fluid film bearing 51 that occupies approximately the same boundary dimensions as the remaining two ball bearings 52 and 53. The dimensions are an inner diameter of 5.247 inches, an outer diameter of 7.502 inches, and a width of 1.047 inches. In this arrangement, the opposed pair of angular contact rolling element bearings 52 and 53 are retained and are located in the uppermost position in order to minimize shaft deflection by shortening the span between the lower and upper bearings. The hydrostatic fluid film bearing 51 desirably is located below the ball bearings with the additional advantage that the rather large amount of exhaust oil flow from the hydrostatic fluid film bearing does not have to flow through the ball bearings in lubricating the bearing system. Thus, churning and over-heating of the lubricating oil is eliminated. In this arrangement, the hydrostatic fluid film bearing 51 is designed to carry substantially all of the thrust load under all conditions except during starting, stopping, reverse loading periods, or during a high pressure lube system failure. Thus, the ball bearings now will normally carry radial load only, plus any reverse axial thrust load should such occur, and the load during starting, stopping, and during the event of a lube system failure.

FIG. 11 of the drawing is an enlarged, detailed sectional view of the hydrostatic boost thrust bearing 51 employed in the hybrid boost bearing arrangement shown in FIG. 10. In addition to achieving the main function of carrying the full thrust load during normal operation of the shaft 11, the bearing design shown in FIG. 11 is intended also to accommodate shaft misalignment, and provides a fail-safe operation in the event of oil system failure. In FIG. 11, the bearing includes a runner 54 attached to the shaft 11, and a two-piece collar 55 and 56 that is secured to a supporting base member. A two-part movable piston is provided which includes a first part 57 and a second part 58. The first part 57 of the movable piston has a plurality of oil pockets 59 formed on its outer surface which are symmetrically disposed in an annular array about its periphery and include land areas 61 that coact with the surface 62 on runner 54 to form a pair of load sustaining bearing surfaces. FIG. 12 of the drawings illustrates the surface configuration of bearing surface 61 including the pockets 59. High pressure oil from a high pressure lubricating oil supply source is introduced through a port 63 and passageways 64 and 65 so that it flows out into the pockets 59 over the land areas 61 and through drain areas 66 and 67 back to a sump for the lubricating oil. If the quantity of oil admitted is constant, as from a constant flow pump, the fluid film thickness developed over the land areas 61 will vary as the load changes. This variation in fluid film thickness with variation in load is set forth in the following equation:

$$h = (K/W)^{1/3} \qquad (1)$$

where h is the fluid film thickness, K is a constant depending upon the parameters of the bearing, and W is the load in pounds.

The hydrostatic fluid film bearing shown in FIG. 11, as described up to this point, with a constant flow of lubricant supplied thereto from a high pressure gear pump or other fixed displacement pump, would be satisfactory to carry the thrust load in a machine environment where there is good bearing alignment, and good initial alignment of the shaft supported by the bearing. In some applications however, such as a helicopter, not only is the basic transmission frame structure somewhat flexible, but also shaft bending, with misalignment through the bearing position, will be experienced due to the moment from the rotor blades. Furthermore, the hydrostatic fluid film bearing will not be located at the center of location of the ball bearings, insofar as shaft bending is concerned. Hence, some lateral movement of the hydrostatic thrust bearing surface with respect to the thrust runner will be experienced as well as an angular misalignment. In order to accommodate this amount of angular misalignment, the upper surface of the first part 57 of the movable piston is fitted with a spherical seating surface 71 with the center of the spherical seating surface located on the undeflected shaft centerline. This seating surface 71 coacts with a complementary-shaped seating surface 72 formed on the front side of the second portion 58 of the movable piston, and is shaped so that fluid under pressure can be transmitted to suitable pockets 73 formed in the spherical seating surface 71. The pockets 73 form a step-seal configuration which will maintain a constant film thickness in the area between the surfaces 71 and 72 regardless of the pressure of the fluid lubricant in a manner described more fully in the above identified Wilcock and Booser text. The pockets 73 are annularly arrayed around the periphery of the spherical seating surface 71, and are connected through large ports 65 to the pockets 59 formed in the hydrostatic bearing surface 61. As a consequence of this arrangement, the fluid lubricant pressure in the pockets 59 and 73 will be equal, and as the pressure in the pockets 59 rises and falls with the bearing load, the overall pressure balance across the first portion 57 of the movable piston will be maintained.

In order to maintain the oil flow rate through the hydrostatic fluid film bearing shown in FIG. 11 within reasonable bounds, the fluid film thicknesses in the land areas between the seating surfaces 71 and 72 must be maintained relatively small. In fact, the film thicknesses at these points should be of the same order of magnitude or smaller than the total ball bearing deflection under the expected load. (Thus, if the high pressure lubricant supply system should fail, these surfaces might otherwise rub without further design features.) To overcome this difficulty, the two parts 57 and 58 are fashioned to operate as a hydraulic piston with lubricating fluid under pressure being fed to a cavity or space 74 in back of the second portion 58 of the moveable piston comprised by the two portions 57 and 58. The design is such that the total load resulting from the lube system feed pressure times the piston area in the space 74 is greater than the integral of the pressure of the load sustaining bearing surface area 61. As a consequence of this arrangement, upon lubricating fluid under pressure from the high pressure lube system being fed to the back of the piston portion 58, the piston portion 58 will be forced up against a stop 75 into working position. A wavy washer or other spring member located at the stop 75 forces retraction of the spherically seated piston portion 58 away from the runner surface 62 in the event of a lubricating system failure.

In operation, high pressure lubricating oil from the high pressure lubricating pump is admitted to the space 74 in back of the piston portion 58 through the single port 63. From this space, the lubricating oil is admitted through passageway 64 and laminar flow restrictors 76 to the seat pocket 73 of the spherically-shaped seating surface, and thence through passageway 65 through the hydrostatic fluid film bearing pockets 59. The purpose of the restrictors 76 is to provide a measure of moment response to the active thrust bearing surface. The spherical seating surface 71, 72, since it has a step seal configuration does not require such restrictors in order to provide an adequate amount of moment response. The stepped seal, however, is further pocketed as shown at 77 in order to provide a feed-through mechanism to the active hydrostatic thrust bearing surfaces. The restrictors 76 are located in the piston portion 58 rather than in the portion 57 since the pockets 77 and 59 must run at equal pressures to provide optimum performance of the step seal. The configuration of the pockets 59 is shown in FIG. 12 of the drawings. Such a configuration for the bearing surfaces will provide some measure of lubrication in the event of a failure of the high pressure lubricating system even though the bearing surfaces are travelling at a relatively low speed of rotation, and are not capable of high pressure pumping action. However, the bearing must depend upon the high pressure lubricant supply system in order to assume load from its paired rolling element bearing.

The piston portion 58 is sealed at its inner and outer diameters by 0-Ring seals 35 which alternatively may comprise piston rings or other types of sealing devices. The hydrostatic fluid film bearing shown in FIG. 11 is assembled in a completed cartridge in order to preserve the cleanliness and integrity of the parts during handling and installation. Assembly is made by pressing part 56 onto part 55, thus locking the inner race, the bearing and the piston into a unitary assembly. In constructing the hydrostatic fluid film bearing of FIG. 11, the spherical seating step seal is designed so that the integrated pressures over the spherical seating surface are equal to the integral of the fluid film pressure over the main thrust bearing surface. In this way, the bearing unit is maintained in equilibrium and the step seal proportions are adjusted so that any disturbing forces result in small changes in the step seal pressure profile so as to maintain the step seal in balance.

The combined load characteristic of the hybrid boost hydrostatic fluid film rolling element bearing assembly of FIG. 10, assuming a normal rated load of 10,000 pounds, is such that the hydrostatic fluid film bearing will carry approximately 11,000 pounds and the rolling element bearing will carry a reverse load of 1,000 pounds, the net load being 10,000 pounds. Under reverse load conditions of 5,000 pounds negative, the hydrostatic fluid film bearing will be adding 1,000 pounds to the load so that the rolling bearing units will be required to support a total of 6,000 pounds load. The design is such that the life of the rolling element bearing units can be expected to increase dramatically as the result of the removal of the thrust load under normal operating conditions. Since radial loading will be taken by the rolling element bearing units, skidding of the balls due to removal of the thrust load will not be a factor.

If an approximation is made that the fatigue life improvement is inversely proportional to the cube of the ratio of the net load vectors, then the life improvement in the hybrid boost bearing assembly of FIG. 10, can be estimated in the following manner. The net normal load on the bearing assembly is given by the square root of the sum of the squares of the 10,000 pound thrust load and the 8,000 pound radial load, or a net vector of approximately 12,800 pounds. This loading is reduced to only a radial load of 8,000 pounds on the rolling element bearing unit by the introduction of the hydrostatic fluid film thrust bearing unit 51. As a consequence, the approximate net increase in fatigue life of the overall hybrid boost bearing assembly may be estimated as the cube of 12,800 divided by 8,000, i.e. $(12,800/8,000) \times 4$ or an improvement in fatigue life by a factor of four.

The film thicknesses in the hydrostatic fluid film thrust bearing and the spherical seat is made small in order to reduce the oil flow requirement. Doing so minimizes the power loss required to pump this quantity of lubricating fluid to a normal operating pressure of about 1,100 psi and also to reduce requirements on oil coolers, transfer lines and other parts of the high pressure lubricating system which would add weight to the machine. As the result of the small film thickness, the hydrostatic fluid film bearing is a very stiff bearing, and this results in the desirable characteristic of being able quickly to pick up loads from the rolling element bearing unit over the full range of load conditions. However, as a result of the high stiffness and small clearance of the hydrostatic fluid film bearing unit, provision must be made for retraction of the fluid film bearing surfaces in the event of a failure of the high pressure lubricant supply system. This is accomplished in the design shown in FIG. 11 by the provision of the spherical seat on the movable piston which is loaded against a control stop by the high pressure fluid lubricant supply, and which is forced back away from the stop by retraction springs in the event of absence of oil. This retraction leaves ample clearance for the bearing insert to rotate in the event that the full load is taken by the rolling element bearing unit.

It is desirable that the bearing insert be made of a material which can withstand occasional accidental rubbing, or be plated or coated with a material making it resistant to accidental contact. Silver-plate over bronze, for example, provides such desirable characteristics. While stop pins (not shown) are normally employed in the bearing arrangement shown in FIG. 11, from a mechanical point of view, it is not necessary to prevent rotation of the bearing ring at the intermediate speed encountered because of its self-alignment capability. However, the use of four pockets in the primary thrust bearing surface to provide a restoring moment makes it desirable also to prevent rotating motion of the moveable piston member so that the pockets can be maintained in alignment with the four lubricant feed restrictors. While tolerances on the bearing design are not too critical, the outer and inner race tolerances of the hydrostatic fluid bearing should be of the same nature as the corresponding rolling element bearing unit outer dimension tolerances. Critical factors are the squareness of the primary thrust bearing surfaces, the flatness of the main bearing surface, and the conformity of the spherical upper surface of the moveable piston portion to the complementary-shaped surface of the lower portion of the movable piston. For best results, these two parts, the bearing runner and the piston, can be lapped to provide good conformity; however, lapping to a high surface finish is not essential, since all that is required is geometrical conformity. The piston diameter should be within about 0.002 inches of the inner diameter of the cavity in the outer race in order properly to fix the center of rotation of the spherical seat.

FIG. 13 of the drawings illustrates still a different form of a hydrostatic, hybrid boost bearing assembly constructed in accordance with the invention. The bearing assembly shown in FIG. 13 is designed for use as the main rotor thrust bearing of a heavy duty helicopter. In such helicopters, the main rotor thrust bearing carries a load of approximately 65,000 pounds at 160 rpm, and for this purpose, nominally employs a stack of four, number 236, split inner race, angular contact ball bearings. FIG. 13 illustrates a design concept wherein the full thrust load can be picked up from the rolling element bearings by a hydrostatic thrust bearing operating at a pressure level of about 3,000 psi which is well within the normal pressure level of the hydraulic systems employed in such aircraft. In addition, virtually all of the 2½ g maneuvering load to which this bearing will be subjected, can be carried by the hydrostatic fluid film bearing. The design also includes features for accommodating misalignment due to shaft bending (approximately 4 milliradians) and for assuring that the fluid film bearing will not rub in the event of a high pressure oil system failure.

The hydrostatic hybrid boost bearing assembly shown in FIG. 13 comprises a pair of opposed angular contact ball bearings 52 and 53 which coact with a hydrodynamic radial-thrust bearing 78 that carries a high percentage of the load whenever the lubricant supply system is operating. The lubricant supply system is designed to employ a MIL-L 7808 lubricant at about 185 F with an oil supply of 11 gallons per minute at 50 psi at a shaft speed of 169 rpm. The normal thrust load on this bearing assembly is about 65,000 pounds and during maneuvering, may be increased by approximately 2½ times to a total of 162,000 pounds, or in the reverse direction, may approximate 33,000 pounds. There is a moment on the upper end of the shaft arising from the vertical load reactions of the rotor blades which results in a radial load of 15,000 pounds when considering the distance apart of the upper rolling element bearing and the lower combined radial and thrust bearing. The radial load during maneuver conditions may also be increased by factor 2½. In addition to the above loads, there may be an additional horizontal maneuver load. Also, due to the large bending moment introduced into the shaft from the vertical rotor blade reaction, the shaft is deflected to such a degree that the calculated maximum slope of the shaft centerline through the lower bearing amounts to 0.0039 inches per inch.

In the hydrostatic hybrid boost bearing assembly shown in FIG. 13, two of four ball bearings have been replaced with a hydrostatic fluid film bearing occupying the same boundary dimensions comprising an inner diameter of 7.087, and an outer diameter of 12.598 inches. The axial length of the hydrostatic fluid film bearing is equal to the same or slightly less than the combined width of the two ball bearings 52 and 53. In the arrangement of FIG. 13, the two ball bearings 52 and 53 are located in the lower position below the hydrostatic fluid film bearing, and are lubricated by exhaust oil from the hydrostatic bearing. Churning of the oil is not a problem in this arrangement because of the very low speed of the shaft 11. The arrangement is such, that the hydrostatic fluid film bearing is designed to carry substantially all of the thrust load under all conditions except during starting, stopping, reverse load periods, or during a high-pressure lube system failure. Thus the ball bearings 52 and 53 normally will carry radial load only, plus reverse axial thrust loads when such occur. In addition to achieving the main function of carrying the full thrust load, the bearing design shown in FIG. 13 is also intended to accommodate shaft misalignment, and fail-safe operation in the event of oil system failure.

As is shown in FIG. 13, the hydrostatic fluid film bearing comprises a runner 84 secured to shaft 11 and a two-piece stator 85 and 86 which define a space in which a two part moveable piston is disposed. The movable piston comprises parts 87 and 88 with the part 87 having four oil pockets 89 formed on its lower surface which are circumferentially disposed about the lower surface in much the same manner as the pockets 59 shown in FIG. 12. High pressure oil is admitted through inlet 63 to the pockets 89 and flows out over the land areas 91 where it forms a fluid film bearing in conjunction with the bearing surface 92 disposed on an opposed conically-shaped face of the runner 84. Exhaust oil then flows out through the ports 93 and 94 back down to the sump, for the high pressure lubricant system. If the quantity of oil admitted to the space between the surfaces 91 and 92 is constant, as from a constant flow pump, the fluid lubricant film thickness formed over the land areas 91 and 92 will vary as the load changes in the manner according to the relationship defined in equation (1) above.

The bearing assembly of FIG. 13 as described up to this point, with a constant flow of lubricant from a high-pressure gear or other fixed displacement pump, could satisfactorily carry the thrust load in a machine assuming good bearing alignment and good initial shaft alignment conditions. In a helicopter, however, not only is the basic transmission frame structure somewhat flexible, but also shaft bending with some misalignment through the bearing position, will be experienced due to the moment from the rotor blades, as previously described. Furthermore, some lateral movement of the hydrostatic thrust bearing with respect to the thrust runner will be experienced in addition to angular misalignment.

In order to accommodate a substantial amount of misalignment, the hydrostatic fluid film thrust bearing 78 shown in FIG. 13 has the coacting bearing surfaces 91 and 92 shaped spherically with an average tangent of about 45°F to the shaft axis, and the upper surface shown at 95 is made planar to accommodate lateral motion, and is floated on a hydrostatic oil film. The upper planar surface 95 of piston member 87 has a plurality of pockets 96 formed therein which comprise in conjunction with the land areas 95, a step-seal for maintaining a constant film thickness in the area between the surface 95 and a confronting planar seating surface 97 formed on the front end of the second moveable piston portion 88. The pockets 96 communicate through ports 98 with the pockets 89 in the main load-assuming bearing surface 91 so that the pressure in the pockets 96 and 89 are equal. Consequently, as the pressure in the pocket 89 rises and falls with the bearing load, the overall pressure balance across the movable piston portion 87 is maintained.

In order to maintain the oil flow rate through the bearing assembly within reasonable bounds, the film thicknesses between surfaces 91 and 92, and between surfaces 95 and 97, must be relatively small. The sum of these clearances should be of the same order of magnitude or smaller than the total ball bearing deflection of the overall hybrid boost bearing assembly under the expected thrust load. Consequently, if the high pressure fluid lubricant supply system should fail, some rubbing might occur between surfaces 91 and 92, or between surfaces 95 and 97. To avoid this possibility, the second moveable piston portion 83 is fashioned as a hydraulic piston with oil from the high pressure lubricant supply system being supplied to a cavity 74 formed in the space between the piston portion 88 and the part 85 of the stator.

Upon fluid lubricant, from the high pressure fluid lubricant supply being forced into the cavity 74, the second movable piston portion 88 will be forced up against a stop 99 into its working position. This is made possible by design of the bearing so that the total load resulting from the feed pressure times the piston area exposed to the cavity 74 is greater than the integral of the pressure over the area between surfaces 95 and 97. A wavy washer or other spring located at 99 forces retraction of the moveable portion 88 in event of an oil system failure. As a consequence of the movement of the movable piston portion 88 into and out of load assuming relationship, the first bearing member portion 87 similarly will be put into or retracted from load assuming relationship with respect to the runner bearing surface 92. Both portions 87 and 88 of the moveable piston thus comprised are loosely pinned or stopped to prevent rotation.

High pressure fluid lubricant is admitted to the bearing assembly through a single port 63 into the cavity 74. From this space, the oil is admitted through four annularly arranged laminar restrictors 101 into the pockets 96 of the spherical seat, and then to the hydrostatic thrust bearing pockets 89. The purpose of the restrictors 101 is to provide some measure of moment response to the active bearing surface. For this reason, the spherical seat is pocketed at 96 to provide a feed-through mechanism from the restrictors 101 to the active bearing surface pockets 89. The restrictors 101 are located in the second moveable piston portion 88 rather than in bearing piston portion 87 since the pockets 89 and 96 must run at equal pressures to provide optimum performance of the stepped seal. The hydrostatic fluid film bearing is sealed at its inner and outer diameters by 0-ring seals 35 which may comprise piston rings or other types of sealing devices, if desired. Again, preferably the bearing is designed to be assembled as a completed cartridge in order to preserve cleanliness and integrity of the parts during handling and installation. Assembly of these parts is made by pressing part 86 onto part 85 thereby locking part 85 of the stator, the bearing and the piston into a single assembly.

The step-seal comprised by the surfaces 95 and 96 are designed so that the integrated pressures over the surfaces are equal to the integral of the load carrying pressure over the main fluid film thrust bearing surface. In this way, the bearing portion 87 of the moveable piston is maintained in equilibrium. The seal proportions are adjusted so that any disturbing forces will result in only small changes in the seal pressure profile, thus maintaining the seal in balance. In the event of any shaft misalignment, the bearing piston portion 87 is free to move laterally a limited amount in order to accommodate such shaft misalignment while at the same time maintaining all sealing and bearing surfaces in operating order.

The fatigue life of the rolling element bearing unit 52 and 53 of the overall hybrid boost bearing assembly shown in FIG. 13 can be expected to be increased substantially as the result of the removal of the thrust load on the rolling element bearing units during normal operation of the bearing assembly. Since radial load still will be taken up by the ball bearings 52 and 53, skidding of the balls due to the removal of the thrust will not be a factor. If an approximation is made that the life improvement is inversely proportional to the cube of the ratio of the net load factors, then the fatigue life improvement of the bearing assembly shown in FIG. 13 can be estimated as follows. The net normal load factor on the lower bearing is given by the square root of the sum of the square of 64,700 pounds and 14,840 pounds or a net factor of 66,500 pounds. This is reduced to only a radial load of 14,800 pounds by the introduction of the hydrostatic fluid film thrust bearing in the manner shown in FIG. 13. Assuming that the two rolling element bearings divide the load equally, the net fatigue life increase factor may be estimated at $$((66,500/2)/(14,800/2))^3 = 26.5.$$

The actual life improvement will approximate the estimate above since it will be effected by the rolling element bearing design equations. To maximize radial load capability angular contact bearings may be used.

In a comparison of FIG. 13 to FIG. 11, it will be seen that the location and configuration of the main thrust bearing surfaces with respect to the step seal seating surfaces have been reversed in order to accommodate the demands of a particular application. One of the benefits of this reversal is that the runner bearing 84 is provided with enlarged dimensions in order to prevent warping of this member under operating conditions. Thus, it will be appreciated that the hybrid boost bearing assembly made available by the present invention allows considerable freedom of choice in the arrangement of the various components of the assembly, and in their configuration.

It will be further noted from a consideration of the fluid film bearing designs shown in FIGS. 11 and 13, that considerable complexity is introduced into these bearings in order to accommodate misalignment. If desired, shaft misalignment, etc., could be accommodated through appropriate design of the rolling element bearing units rather than through the fluid film bearing units. FIG. 16 of the drawings is a diagrammatic sketch of a spherical rolling element bearing unit 13 which could be employed in place of the rolling element bearing units used in the hybrid boost bearing assemblies shown in FIGS. 10 and 13. With such modification, there should be no need for these assemblies to use fluid film bearing designs that provide a misalignment capability. In the spherical rolling element bearing unit shown in FIG. 16, one of the races (preferably the outer race 17) is provided with a spherically shaped, concave surface having a radius R, for accommodating shaft misalignment, etc. Consequently, should any misalignment occur, it would be taken up in the spherical rolling element bearing and only a fluid film bearing of the straight forward preload or retraction type, for example, would be required.

From the foregoing description, it will be appreciated that the invention provides a new and improved hybrid boost bearing that combines a rolling element bearing and a fluid film bearing in a single assembly. The arrangement is such that the load on the overall bearing assembly is assumed during normal operating conditions by the fluid film bearing and the rolling element bearing functions to carry the load only during starting, stopping, reverse loading conditions, or in the event of a lubrication system failure. Consequently, the rolling element bearing is subjected to above nominal loading only during transient starting, stopping, reverse thrust periods, and during emergency lube system failures, the totality of which do not seriously shorten the expected fatigue life of the overall hybrid boost bearing assembly. The hybrid boost bearing assembly can be designed (packaged) to fit the same volume as an equivalent roller bearing or ball bearing and has modest lubricant system requirements so that it can be readily substituted into existing conventional engine configurations or substituted for conventional rolling element bearing packages. The design of the hybrid boost bearing assembly is such that it greatly reduces the effect of fatigue on the operating life of the overall bearing assembly. This is achieved due to the fact that it avoids unnecessary wear of the rolling element bearing during normal operating periods. In addition to these characteristics, the hybrid boost bearing assembly possesses an excellent capability of starting and stopping with deficient or no oil supply. The hybrid boost bearing assembly can be designed with an ability to withstand overloads and misalignments which may arise due to other parts of the machine. Such misalignment capability is exemplified by the various bearing designs intended for use as the main rotor thrust bearing of a helicopter wherein because of the nature of the machine, some misalignment can be anticipated. Additionally, the hybrid boost bearing assembly possesses low starting torque characteristics even at extremely low temperatures. In the event of a lubrication system failure, the full load can be returned to the rolling element bearing unit and the assembly will still continue to operate satisfactorily for extended periods. While the hybrid boost bearing assembly has been described primarily for use in conjunction with a liquid lubricant such as natural petroleum oil, or a synthetic oil, or grease, it may be used with a gaseous lubricant where the design characteristics of the bearing assembly are such as to accommodate such as a fluid lubricant.

The fluid film bearing unit employed as a part of the overall assembly may be either a hydrostatic, a hydrodynamic, or may be a hybrid hydrostatic-hydrodynamic fluid film bearing. It may be used with any form of rolling element bearing such as an angular contact ball bearing, roller bearing, spherical rolling element bearing, etc. The design of the fluid film bearing may be any known design such as the shrouded step (modified Rayleigh pad), the spiral groove, the herringbone, the tapered land, the tilting pad, or any other known form of fluid film bearing construction. The principal may be employed in conjunction with thrust bearings, radial bearings, combined thrust-radial bearings, or spherical bearings as determined by the needs of a particular application. In some configurations of interest, it will be desirable to extract some high pressure fluid lubricant from the immediate region of the bearing surface in order to provide retraction or self-aligning features to the overall hybrid boost bearing assembly. The shrouded step hydrodynamic bearing design is preferred for this purpose because of the ability of this particular design to supply some lubricant under high pressure for actuating the retraction of self aligning features. Where a self-aligning seat is provided, the design may be such by inclusion of appropriate stepped lands that a constant film thickness is always maintained on the self-aligned seat. If desired, the self-aligned seating surfaces and/or the opposed, coacting bearing surfaces may be provided with additional step depth beyond optimum value to allow for any rubbing that might take place. Preferably, also the bearing and/or seating surfaces are specially treated to minimize the effect of any such rubbing contact. If desired, exhaust oil from the fluid film bearing unit may be employed to lubricated the rolling element unit. Several basic hybrid boost bearing assembly designs have been disclosed including a limited preload type, a retraction type, and types incorporating a self-aligning capability as well as combined retraction types having misalignment capability. Further, by appropriate control of the inlet lubricant supply pressure and/or the bearing clearances, the rolling element bearing unit can be made to assume any desired share of the load to be carried by the hybrid boost bearing assembly.

Having described several embodiments of a new and improved hybrid boost bearing assembly constructed in accordance with the invention, it is believed obvious that other modifications and variations of the invention are possible in the light of the above teachings. It is therefore to be understood that changes may be made in the particular embodiments of the invention described which are within the full intended scope of the invention as defined by the appended claims.

What is claimed is:

1. A hybrid boost bearing assembly for a rotating shaft member rotatably supported on a base member, the hybrid boost bearing assembly comprising a rolling element bearing for rotatably supporting the shaft member on the base member, a fluid film bearing coacting with said rolling element bearing for rotatably supporting the shaft member on the base member, fluid lubricant supply means for supplying fluid lubricant to at least the fluid film bearing, and means for shifting the loading of the rotating shaft member from the rolling element bearing to the fluid film bearing as the rotating shaft member is brought up to its normal operating speed and in shifting the loading from the fluid film bearing to the rolling element bearing as the shaft decreases in speed, said means for shifting the loading from the rolling element bearing to the fluid film bearing comprising fluid lubricant pressurizing means for increasing the thickness of the fluid film lubricant in the space between opposed bearing surfaces on the rotating shaft member and the supporting base member, respectively, thereby to cause the fluid film bearing to assume a greater share of the load of the rotating shaft as it is brought up to normal operating speed, said fluid film bearing including a movable bearing piston portion on which a bearing surface is formed and a separate backing portion, said movable bearing piston portion being comprised of two parts which are intercoupled through a spherically shaped self-aligning seat for accommodating misalignment of the rotating shaft member, retraction spring means acting on the movable bearing piston portion for moving the movable bearing piston portion back out of load assuming relationship during start-up, stopping and upon any failure of the fluid lubricant system, and means for introducing high pressure fluid lubricant into the space between the movable bearing piston portion and the backing portion for causing the movable bearing piston portion to move the bearing surface into load assuming relationship, the integral of the exposed surfaces of the movable bearing piston portion and backing portion times the fluid lubricant pressure in the space between the movable bearing piston portion and the backing portion exceeding the integral of the fluid lubricant pressure times the exposed bearing surfaces and the retraction spring action.

2. A hybrid boost bearing assembly according to claim 1 wherein the fluid film bearing is a hydrostatic bearing.

3. A hybrid boost bearing assembly according to claim 1 wherein the fluid film bearing is a hybrid hydrodynamic-hydrostatic bearing.

4. A hybrid boost bearing assembly according to claim 1 wherein predetermined proportionate shares of the rotating shaft load are distributed between the rolling element bearing and the fluid film bearing.

5. A hybrid boost bearing assembly according to claim 1 wherein the rolling element bearing assumes substantially the full load of the rotating shaft during starting, stopping, reverse loading, and in the event of a failure of the fluid lubricant supply means and at least a portion of one of the bearings is movably supported relative to the base member and the rotating shaft member to be movable along an axis extending in the main loading direction of the rotating shaft member for movement into and out of load assuming relationship by the increasing thickness fluid film lubricant as the rotating shaft is brought up to speed.

6. A hybrid boost bearing assembly according to claim 5 wherein the fluid film bearing is a hydrodynamic type shrouded step bearing and wherein the step depth of the bearing is greater than that required for optimum performance as an additional safety feature in the event of wear due to contact during start-up, stopping or failure of the lubricant system.

7. A hybrid boost bearing according to claim 1 wherein the bearing design is of the hydrodynamic self-acting type capable of high pressure pumping action between the bearing surfaces and a passageway for the fluid lubricant is interposed intermediate the bearing surfaces and the space between the backing portion and the movable bearing piston portion for introducing high pressure fluid lubricant into the space.

8. A hybrid boost bearing assembly according to claim 1 wherein the spherically-shaped self-aligning seat is comprised by a spherically-shaped seating surface on one of the parts and a complimentary shaped pocket surface on the remaining part and means for introducing fluid lubricant at high pressure into the space between the spherically shaped seating surface and the complimentary-shaped pocket surface.

9. A hybrid boost bearing assembly according to claim 8 wherein the means for introducing fluid lubricant at high pressure into the spherically-shaped self aligning seat comprises a passageway interconnecting the space between the spherically shaped seating surface and the complimentary-shaped pocket surface with the passageway interconnecting the bearing surfaces and the space between the backing portion and the movable bearing piston portion whereby the pressure of the fluid lubricant in all three spaces is substantially equalized.

10. A hybrid boost bearing assembly according to claim 9 wherein the spherically-shaped self aligning seat is sealed by the lands of a step seal whereby a substantially uniform thickness film of fluid lubricant is maintained in the seat.

11. A hybrid boost bearing assembly according to claim 10 wherein the opposed bearing surfaces of the fluid film bearing form a hydrodynamic type shrouded step thrust bearing, the step depth of the thrust bearing is greater than that required for optimum performance as an additional safety feature in the event of wear due to contact during start-up, stopping or failure of the lubricant system, and the rolling element bearing is an angular contact ball bearing.

12. A hybrid boost bearing assembly according to claim 1 wherein fluid film bearing comprises a thrust bearing formed by an annular collar secured to and rotatable with the shaft member and coacting with an opposed annular bearing surface formed on a housing secured to the base member and surrounding the shaft member.

13. A hybrid boost bearing according to claim 1 wherein the fluid film bearing is a replaceable unit that can be physically substituted in place of a rolling element bearing of comparable dimensions.

* * * * *